US012646256B2

(12) United States Patent
Wang et al.

(10) Patent No.: US 12,646,256 B2
(45) Date of Patent: Jun. 2, 2026

(54) INFORMATION PROCESSING METHOD, COMPUTER DEVICE, AND STORAGE MEDIUM

(71) Applicant: MaShang Consumer Finance Co., Ltd., Chongqing (CN)

(72) Inventors: Chun Wang, Chongqing (CN); Dingheng Zeng, Chongqing (CN); Xunyi Zhou, Chongqing (CN); Ning Jiang, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 88 days.

(21) Appl. No.: 18/396,966

(22) Filed: Dec. 27, 2023

(65) Prior Publication Data

US 2024/0135643 A1    Apr. 25, 2024

Related U.S. Application Data

(63) Continuation of application No. PCT/CN2022/140143, filed on Dec. 19, 2022.

(30) Foreign Application Priority Data

| | | |
|---|---|---|
| Apr. 8, 2022 | (CN) | 202210370142.1 |
| Apr. 8, 2022 | (CN) | 202210370143.6 |
| Apr. 8, 2022 | (CN) | 202210370145.5 |

(51) Int. Cl.
*G06T 7/40*        (2017.01)
*G06T 15/04*        (2011.01)
(Continued)

(52) U.S. Cl.
CPC .............. *G06T 17/10* (2013.01); *G06T 15/04* (2013.01); *G06T 15/506* (2013.01); *G06V 10/54* (2022.01);
(Continued)

(58) Field of Classification Search
CPC ....... G06T 17/10; G06T 15/04; G06T 15/506; G06V 40/174; G06V 40/171;
(Continued)

(56) References Cited

U.S. PATENT DOCUMENTS 8,249,310 B2 *    8/2012    Okubo ................. G06V 40/165
382/206
8,300,900 B2 *    10/2012    Lai .................... G06F 18/24147
382/118
(Continued)

FOREIGN PATENT DOCUMENTS

| CN | 109635680 | 4/2019 |
|---|---|---|
| CN | 112633191 A | 4/2021 |

(Continued)

OTHER PUBLICATIONS

Ercheng Pei et al: "Monocular 3D Facial Expression Features for Continuous Affect Recognition", IEEE Transactions on Multimedia, IEEE, USA, vol. 23, Sep. 25, 2020, pp. 3540-3550, XP011883722, ISSN:1520-9210, DOI: 10.1109/TMM. 2020.3026894.
(Continued)

*Primary Examiner* — Cheng Yuan Tseng
(74) *Attorney, Agent, or Firm* — PV IP PC; Wei Te Chung

(57) ABSTRACT

The embodiment of the present application provides an information processing method, a device, a computer device, and a storage medium. The embodiment of the present application obtains a target video, each frame of the target video including a face image corresponding to a same object; inputting the face image of each frame into a first target preset backbone model, and outputting a first target image feature; inputting the first target image feature into a first target preset network model, and correspondingly outputting a first target expression coefficients. By decoupling the first target expression coefficient from non-expression
(Continued)

coefficient, an accuracy of the expression coefficient that is extracted is greatly improved.

19 Claims, 13 Drawing Sheets

(51) Int. Cl.

| | |
|---|---|
| *G06T 15/50* | (2011.01) |
| *G06T 17/10* | (2006.01) |
| *G06V 10/54* | (2022.01) |
| *G06V 10/778* | (2022.01) |
| *G06V 10/82* | (2022.01) |
| *G06V 20/40* | (2022.01) |
| *G06V 20/70* | (2022.01) |
| *G06V 40/16* | (2022.01) |

(52) U.S. Cl.
CPC ............ *G06V 10/778* (2022.01); *G06V 10/82* (2022.01); *G06V 20/41* (2022.01); *G06V 20/46* (2022.01); *G06V 20/49* (2022.01); *G06V 20/70* (2022.01); *G06V 40/171* (2022.01); *G06V 40/172* (2022.01); *G06V 40/174* (2022.01)

(58) Field of Classification Search
CPC .... G06V 40/172; G06V 10/778; G06V 10/54; G06V 10/82; G06V 20/70; G06V 20/49; G06V 20/46; G06V 20/41
See application file for complete search history.

(56) References Cited

U.S. PATENT DOCUMENTS

| | | | | |
|---|---|---|---|---|
| 8,320,660 | B2 * | 11/2012 | Ishiyama | G06V 10/60 |
| | | | | 382/154 |
| 9,361,723 | B2 * | 6/2016 | Zhou | G06V 40/174 |
| 9,710,698 | B2 * | 7/2017 | Ma | G06V 40/172 |
| 10,402,627 | B2 * | 9/2019 | Ju | G06V 40/172 |
| 10,558,851 | B2 * | 2/2020 | Nakano | G06V 40/161 |
| 10,783,352 | B2 * | 9/2020 | Huang | G06V 40/176 |
| 10,909,356 | B2 * | 2/2021 | Liang | G06V 40/175 |
| 11,010,600 | B2 * | 5/2021 | Qing | G06N 3/044 |
| 11,087,519 | B2 * | 8/2021 | Chen | G06V 40/175 |
| 11,216,652 | B1 * | 1/2022 | Tao | G06V 40/161 |
| 11,295,157 | B2 * | 4/2022 | Guo | G06T 17/00 |
| 11,302,064 | B2 * | 4/2022 | Li | G06T 7/50 |
| 11,321,960 | B2 * | 5/2022 | Zhou | H04N 13/257 |
| 11,380,050 | B2 * | 7/2022 | Zhe | G06N 3/088 |
| 11,605,193 | B2 * | 3/2023 | Bao | G06F 3/167 |
| 11,688,105 | B2 * | 6/2023 | Guo | G06T 7/248 |
| | | | | 382/118 |
| 11,715,259 | B2 * | 8/2023 | Chen | G06T 17/00 |
| | | | | 345/419 |
| 11,748,934 | B2 * | 9/2023 | Lin | G06V 40/161 |
| | | | | 345/419 |
| 11,854,540 | B2 * | 12/2023 | Maitra | G10L 25/57 |
| 11,900,557 | B2 * | 2/2024 | Lin | G06T 19/20 |
| 11,941,753 | B2 * | 3/2024 | Zhou | G06T 19/20 |
| 11,948,236 | B2 * | 4/2024 | Yang | G10L 15/26 |
| 11,961,327 | B2 * | 4/2024 | Chen | G06V 10/449 |
| 12,020,469 | B2 * | 6/2024 | Lyu | G06V 10/751 |
| 12,032,728 | B2 * | 7/2024 | Munro | G06F 3/011 |
| 12,079,936 | B2 * | 9/2024 | Yang | G06T 17/00 |
| 12,131,407 | B2 * | 10/2024 | Wang | G06N 3/08 |
| 12,148,250 | B2 * | 11/2024 | Gao | G06V 40/45 |
| 12,266,042 | B2 * | 4/2025 | Kimura | G06V 40/176 |
| 2018/0247184 | A1 * | 8/2018 | Lannes | G06F 18/214 |
| 2021/0142440 | A1 * | 5/2021 | Ahn | G06V 40/171 |
| 2021/0192192 | A1 * | 6/2021 | Li | G06N 3/02 |
| 2021/0279475 | A1 * | 9/2021 | Tusch | H04L 63/0861 |
| 2021/0357625 | A1 * | 11/2021 | Song | G06T 5/70 |
| 2021/0390792 | A1 * | 12/2021 | Xu | G06V 40/168 |
| 2023/0066616 | A1 * | 3/2023 | Zhao | G06N 20/00 |

FOREIGN PATENT DOCUMENTS

| | | |
|---|---|---|
| CN | 112884881 | 6/2021 |
| CN | 113887529 | 1/2022 |
| CN | 114782864 | 7/2022 |
| CN | 114783022 | 7/2022 |
| CN | 114821404 | 7/2022 |
| EP | 4293567 A | 12/2023 |

OTHER PUBLICATIONS

James Ren Hou Lee et al: "TimeConvNets: A Deep Time Windowed Convolution Neural Network Design or Real-time Video Facial Expression Recognition", 2020 17th Conference on Computer and Robot Vision (CRV), May 13, 2020, pp. 9-16, XP033777352, DOI:10.1109/CRV50864.2020.00010.
EPO Office Action issued in corresponding EP Patent Application No. 22936399.9 dated Feb. 3, 2026, pp. 1-7.

* cited by examiner

Computer device

Target vedio

201

Obtain a target video, each frame of the target video includes a face image corresponding to a same object

202

Obtain a first target image feature corresponding to the face image of each frame

203

Obtain a first target expression coefficient corresponding the first target image feature The server obtains an initial video, extracts a face image of each frame in the initial video, and determines one or more video segments from the initial video, each of the one or more video segments includes at least two frames and the same object appears in each of the at least two frames — 301

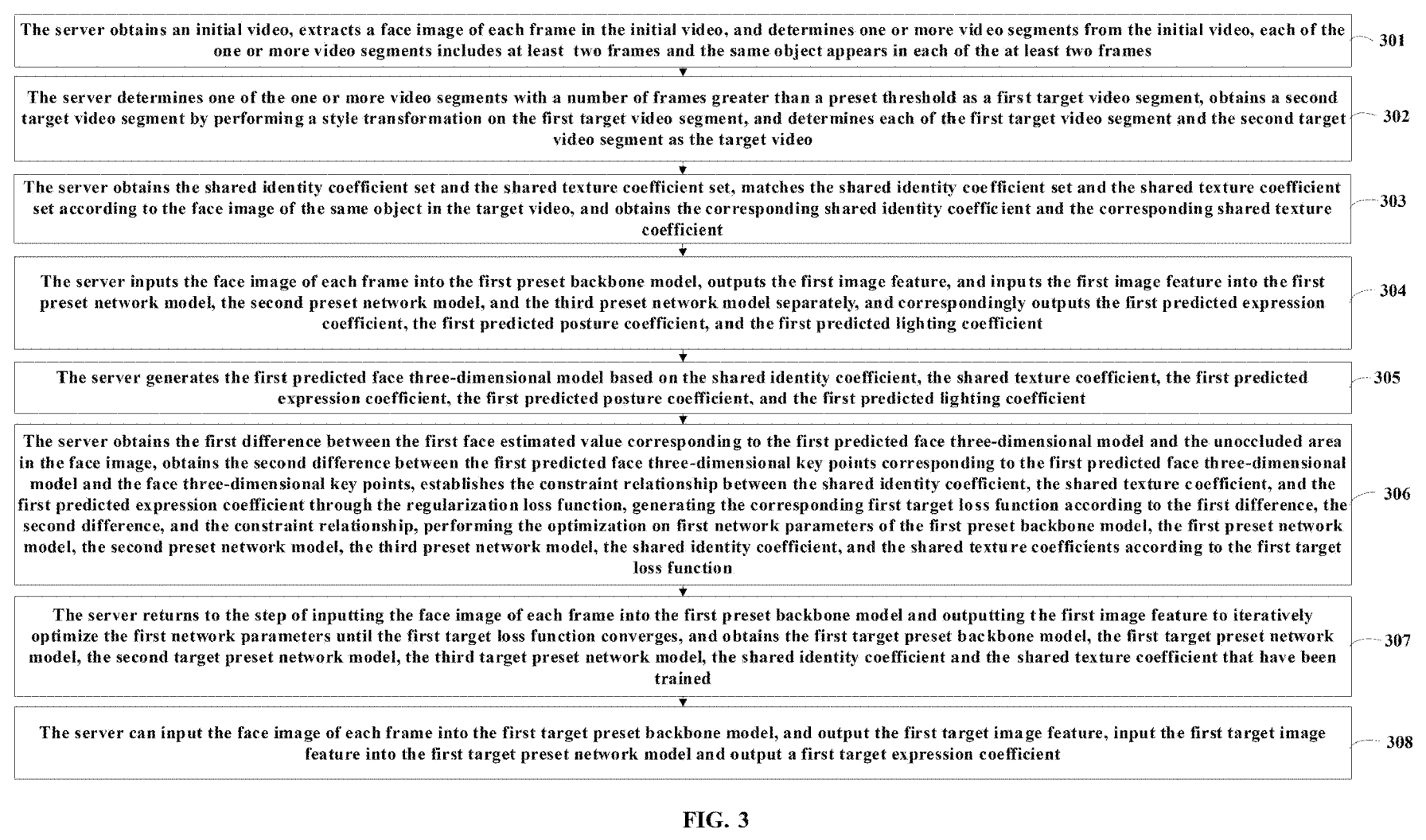

The server determines one of the one or more video segments with a number of frames greater than a preset threshold as a first target video segment, obtains a second target video segment by performing a style transformation on the first target video segment, and determines each of the first target video segment and the second target video segment as the target video — 302

The server obtains the shared identity coefficient set and the shared texture coefficient set, matches the shared identity coefficient set and the shared texture coefficient set according to the face image of the same object in the target video, and obtains the corresponding shared identity coefficient and the corresponding shared texture coefficient — 303

The server inputs the face image of each frame into the first preset backbone model, outputs the first image feature, and inputs the first image feature into the first preset network model, the second preset network model, and the third preset network model separately, and correspondingly outputs the first predicted expression coefficient, the first predicted posture coefficient, and the first predicted lighting coefficient — 304

The server generates the first predicted face three-dimensional model based on the shared identity coefficient, the shared texture coefficient, the first predicted expression coefficient, the first predicted posture coefficient, and the first predicted lighting coefficient — 305

The server obtains the first difference between the first face estimated value corresponding to the first predicted face three-dimensional model and the unoccluded area in the face image, obtains the second difference between the first predicted face three-dimensional key points corresponding to the first predicted face three-dimensional model and the face three-dimensional key points, establishes the constraint relationship between the shared identity coefficient, the shared texture coefficient, and the first predicted expression coefficient through the regularization loss function, generating the corresponding first target loss function according to the first difference, the second difference, and the constraint relationship, performing the optimization on first network parameters of the first preset backbone model, the first preset network model, the second preset network model, the third preset network model, the shared identity coefficient, and the shared texture coefficients according to the first target loss function — 306

The server returns to the step of inputting the face image of each frame into the first preset backbone model and outputting the first image feature to iteratively optimize the first network parameters until the first target loss function converges, and obtains the first target preset backbone model, the first target preset network model, the second target preset network model, the third target preset network model, the shared identity coefficient and the shared texture coefficient that have been trained — 307

The server can input the face image of each frame into the first target preset backbone model, and output the first target image feature, input the first target image feature into the first target preset network model and output a first target expression coefficient — 308

FIG. 3

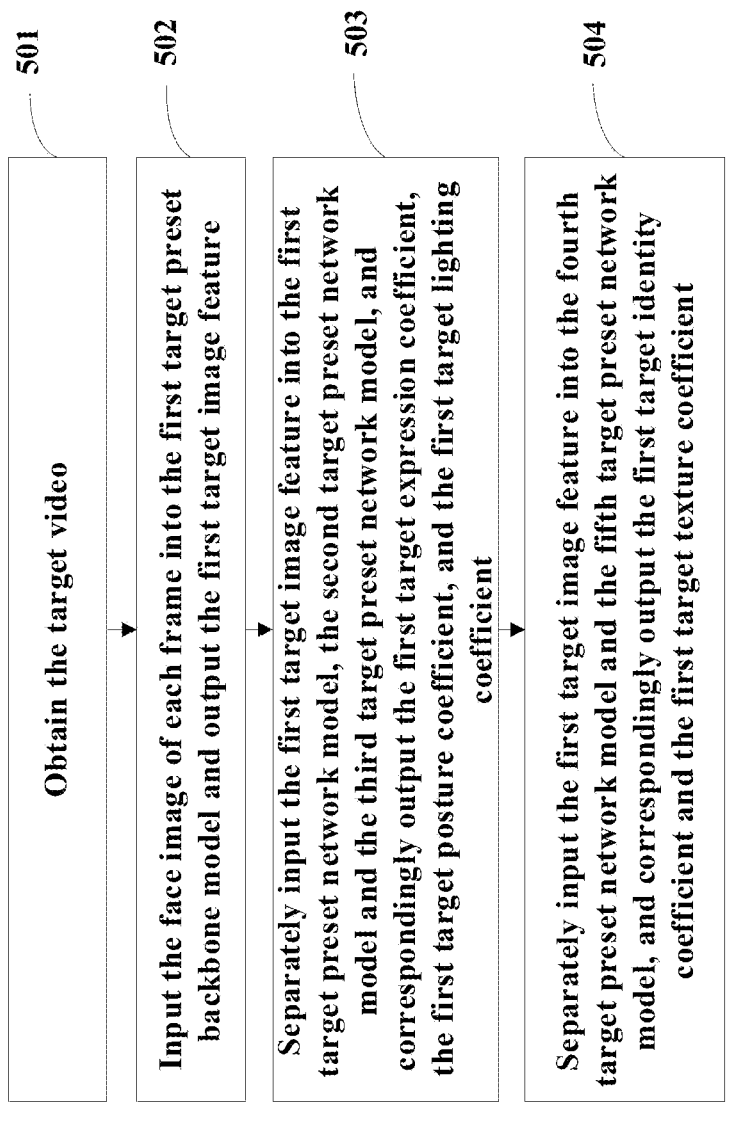

501

Obtain the target video

502

Input the face image of each frame into the first target preset backbone model and output the first target image feature

503

Separately input the first target image feature into the first target preset network model, the second target preset network model and the third target preset network model, and correspondingly output the first target expression coefficient, the first target posture coefficient, and the first target lighting coefficient

504

Separately input the first target image feature into the fourth target preset network model and the fifth target preset network model, and correspondingly output the first target identity coefficient and the first target texture coefficient

FIG. 5

601 — The server obtains an initial video, extracts a face image of each frame in the initial video, and determines a video segment with a plurality of frames in which a same object appears continuously as an initial video segment 602 — The server determines the initial video segment with a frame number greater than the preset threshold as a first target video segment, performs a style transformation on the first target video segment to obtain a second target video segment, and determines the first target video segment and the second target video segment as target videos 603 — The server obtains the shared identity coefficient set and the shared texture coefficient set, matches the shared identity coefficient set and the shared texture coefficient set according to the face image of the same object in the target video, and obtains the corresponding shared identity coefficient and the corresponding shared texture coefficient 604 — The server inputs the face image of each frame into the first preset backbone model, and outputs the first image feature, separately inputs the first image feature into the first preset network model, the second preset network model, and the third preset network model, and correspondingly outputs the first predicted expression coefficient, the first predicted posture coefficient, and the first predicted lighting coefficient 605 — The server generates a first predicted face three-dimensional model based on the shared identity coefficient, the shared texture coefficient, the first predicted expression coefficient, the first predicted posture coefficient, and the first predicted lighting coefficient 606 — The server obtains a first difference between the first face estimated value corresponding to the first predicted face three-dimensional model and the unoccluded area in the face image, obtains a second difference between the first predicted face three-dimensional model and the face three-dimensional key points, establishes a constraint relationship between the shared identity coefficient, the shared texture coefficient, and the first predicted expression coefficient through a regularization loss function, generates a corresponding first target loss function according to the first difference, the second difference, and the constraint relationship, and optimizes first network parameters of the first preset backbone model, the first preset network model, the second preset network model, the third preset network model, the shared identity coefficient, and the shared texture coefficient according to the first target loss function 607 — The server returns to input the face image of each frame into the first preset backbone model, and outputs the first image feature to iteratively optimize the first network parameters until the first target loss function converges, and obtains the first target preset backbone model, the first target preset network model, the second target preset network model, the third target preset network model, the third target preset network model, the shared identity coefficient, and the shared texture coefficient that have been trained 608 — The server inputs the face image of each frame into the first target preset backbone model, and outputs the first target image feature, separately inputs the first target image feature into the first target preset network model, the second target preset network model, the third target preset network model, and correspondingly outputs the first target expression coefficient, the first target posture coefficient, and the first target lighting coefficient 609 — The server separately inputs the first target image feature into the fourth preset network model and the fifth preset network model, and correspondingly outputs the first predicted identity coefficient and the first predicted texture coefficient, establishes a third difference based on a difference between the first predicted identity coefficient and a label identity coefficient and a difference between the first predicted texture coefficient, determine predicted geometry information and predicted texture information of the second predicted face three-dimensional model based on the first predicted identity coefficient, the first predicted texture coefficient, the first target posture coefficient, and the first target lighting coefficient 610 — The server establishes a fourth difference based on a difference between the predicted geometry information and the label geometry information and a difference between the predicted texture information and the label texture information, establishes a second target loss function based on the third difference and the fourth difference, optimizes the second network parameters of the fourth preset network model and the fifth preset network model according to the second target loss function, and returns to separately input the first target image feature into the fourth preset network model and the fifth preset network model, and correspondingly outputs the first predicted identity coefficient and the first predicted texture coefficient to iteratively optimize the second network parameters until the second target loss function converges, and obtains the fourth target preset network model and the fifth target preset network model that have been trained 611 — The server separately inputs the first target image feature into the fourth target preset network model and the fifth target preset network model, and correspondingly outputs the first target identity coefficient and the first target texture coefficient

FIG. 6

Figure 8:
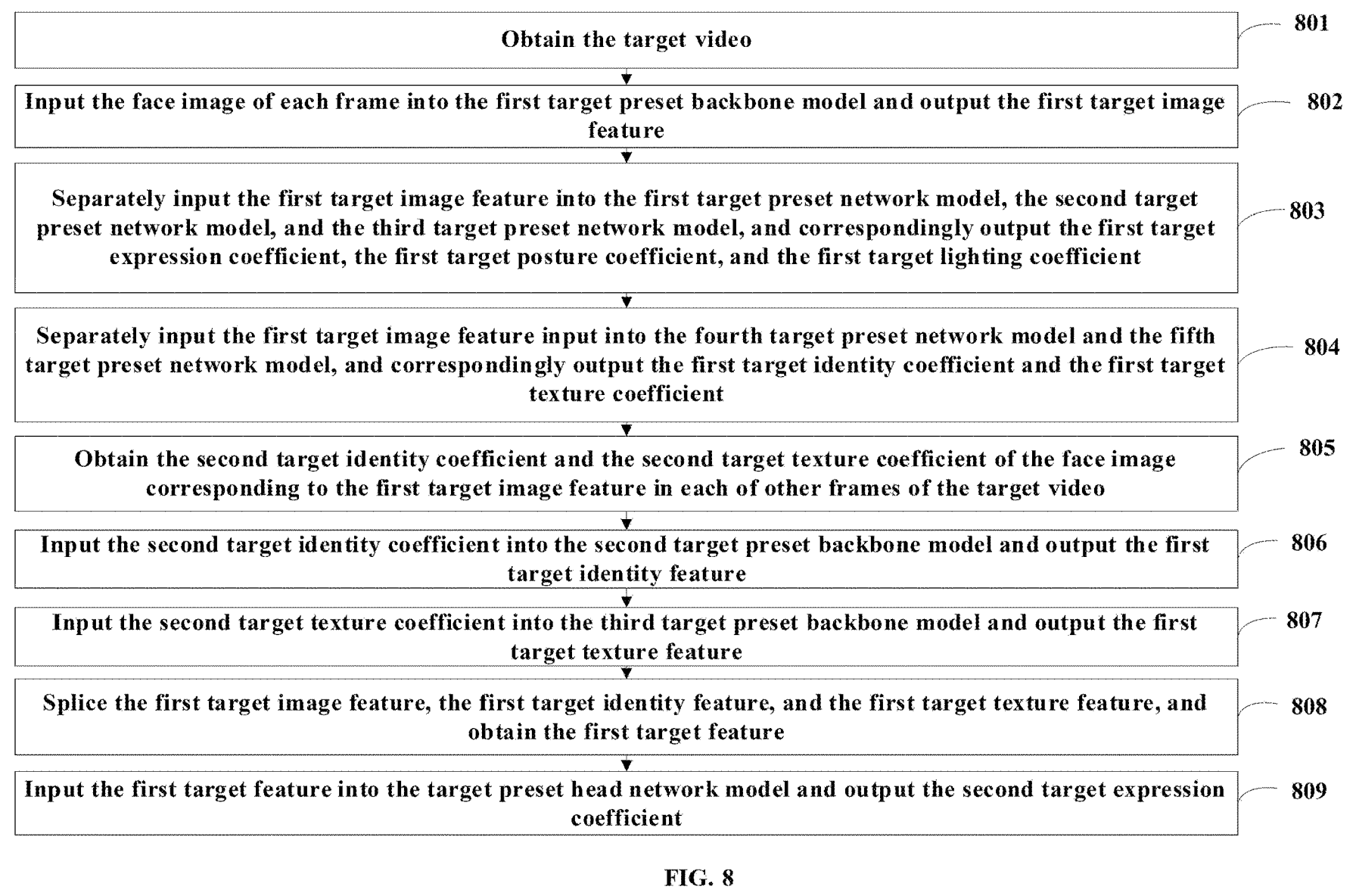

801  Obtain the target video

802  Input the face image of each frame into the first target preset backbone model and output the first target image feature 803  Separately input the first target image feature into the first target preset network model, the second target preset network model, and the third target preset network model, and correspondingly output the first target expression coefficient, the first target posture coefficient, and the first target lighting coefficient 804  Separately input the first target image feature input into the fourth target preset network model and the fifth target preset network model, and correspondingly output the first target identity coefficient and the first target texture coefficient 805  Obtain the second target identity coefficient and the second target texture coefficient of the face image corresponding to the first target image feature in each of other frames of the target video 806  Input the second target identity coefficient into the second target preset backbone model and output the first target identity feature 807  Input the second target texture coefficient into the third target preset backbone model and output the first target texture feature 808  Splice the first target image feature, the first target identity feature, and the first target texture feature, and obtain the first target feature 809  Input the first target feature into the target preset head network model and output the second target expression coefficient

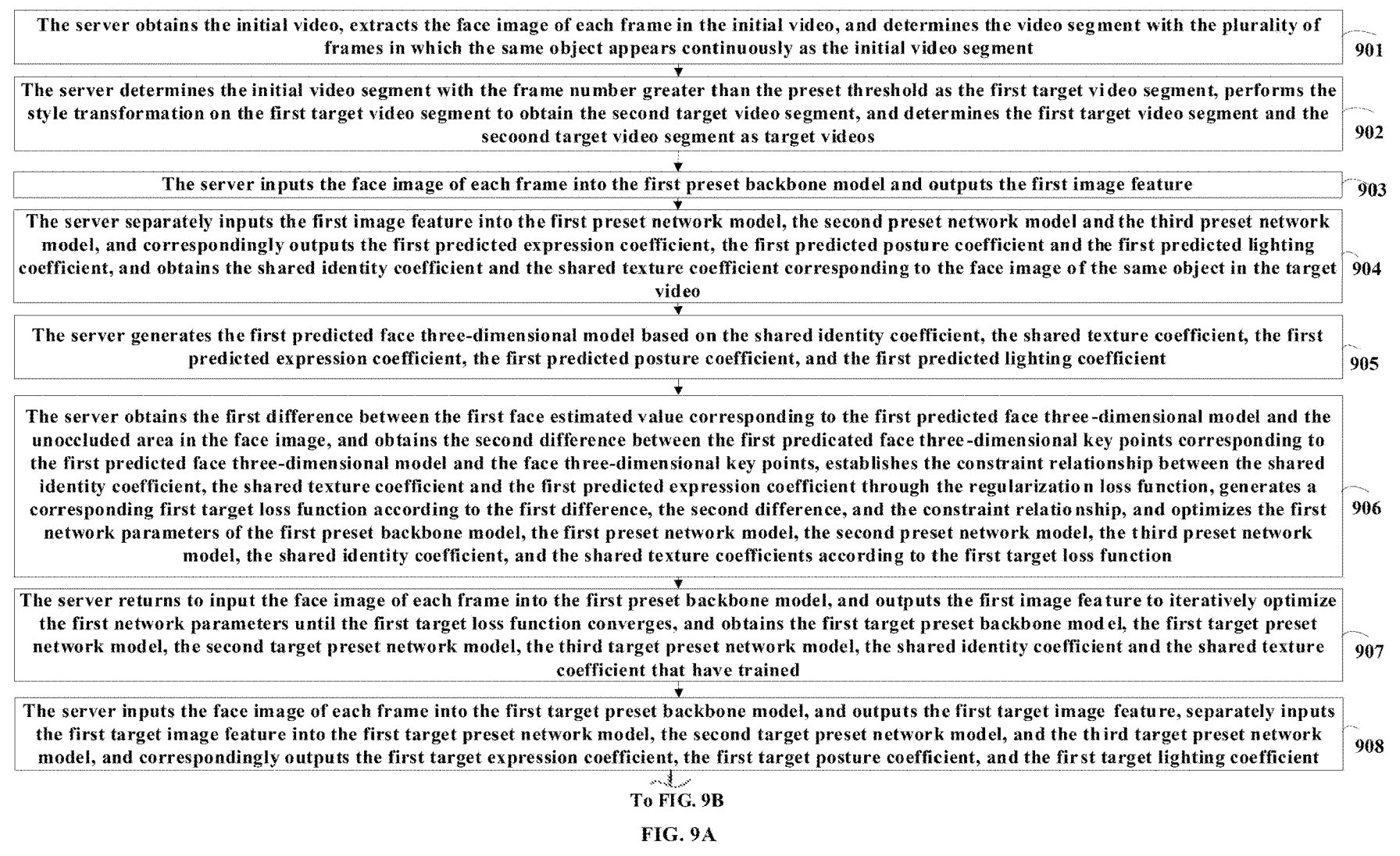

The server obtains the initial video, extracts the face image of each frame in the initial video, and determines the video segment with the plurality of frames in which the same object appears continuously as the initial video segment

902

The server determines the initial video segment with the frame number greater than the preset threshold as the first target video segment, performs the style transformation on the first target video segment to obtain the second target video segment, and determines the first target video segment and the second target video segment as target videos

903

The server inputs the face image of each frame into the first preset backbone model and outputs the first image feature

904

The server separately inputs the first image feature into the first preset network model, the second preset network model and the third preset network model, and correspondingly outputs the first predicted expression coefficient, the first predicted posture coefficient and the first predicted lighting coefficient, and obtains the shared identity coefficient and the shared texture coefficient corresponding to the face image of the same object in the target video

905

The server generates the first predicted face three-dimensional model based on the shared identity coefficient, the shared texture coefficient, the first predicted expression coefficient, the first predicted posture coefficient, and the first predicted lighting coefficient

906

The server obtains the first difference between the first face estimated value corresponding to the first predicted face three-dimensional model and the first face three-dimensional model and the unoccluded area in the face image, and obtains the second difference between the first predicated face three-dimensional key points corresponding to the first predicted face three-dimensional model and the face three-dimensional key points, establishes the constraint relationship between the shared identity coefficient, the shared texture coefficient and the first predicted expression coefficient through the regularization loss function, generates a corresponding first target loss function according to the first difference, the second difference, and the constraint relationship, and optimizes the first network parameters of the first preset backbone model, the first preset network model, the second preset network model, the third preset network model, the shared identity coefficient, and the shared texture coefficients according to the first target loss function

907

The server returns to input the face image of each frame into the first preset backbone model, and outputs the first image feature to iteratively optimize the first network parameters until the first target loss function converges, and obtains the first target preset backbone model, the first target preset network model, the second target preset network model, the third target preset network model, the shared identity coefficient and the shared texture coefficient that have trained

908

The server inputs the face image of each frame into the first target preset backbone model, and outputs the first target image feature, separately inputs the first target image feature into the first target preset network model, the second target preset network model, and the third target preset network model, and correspondingly outputs the first target expression coefficient, the first target posture coefficient, the first target lighting coefficient To FIG. 9B

FIG. 9A

Figure 9B:
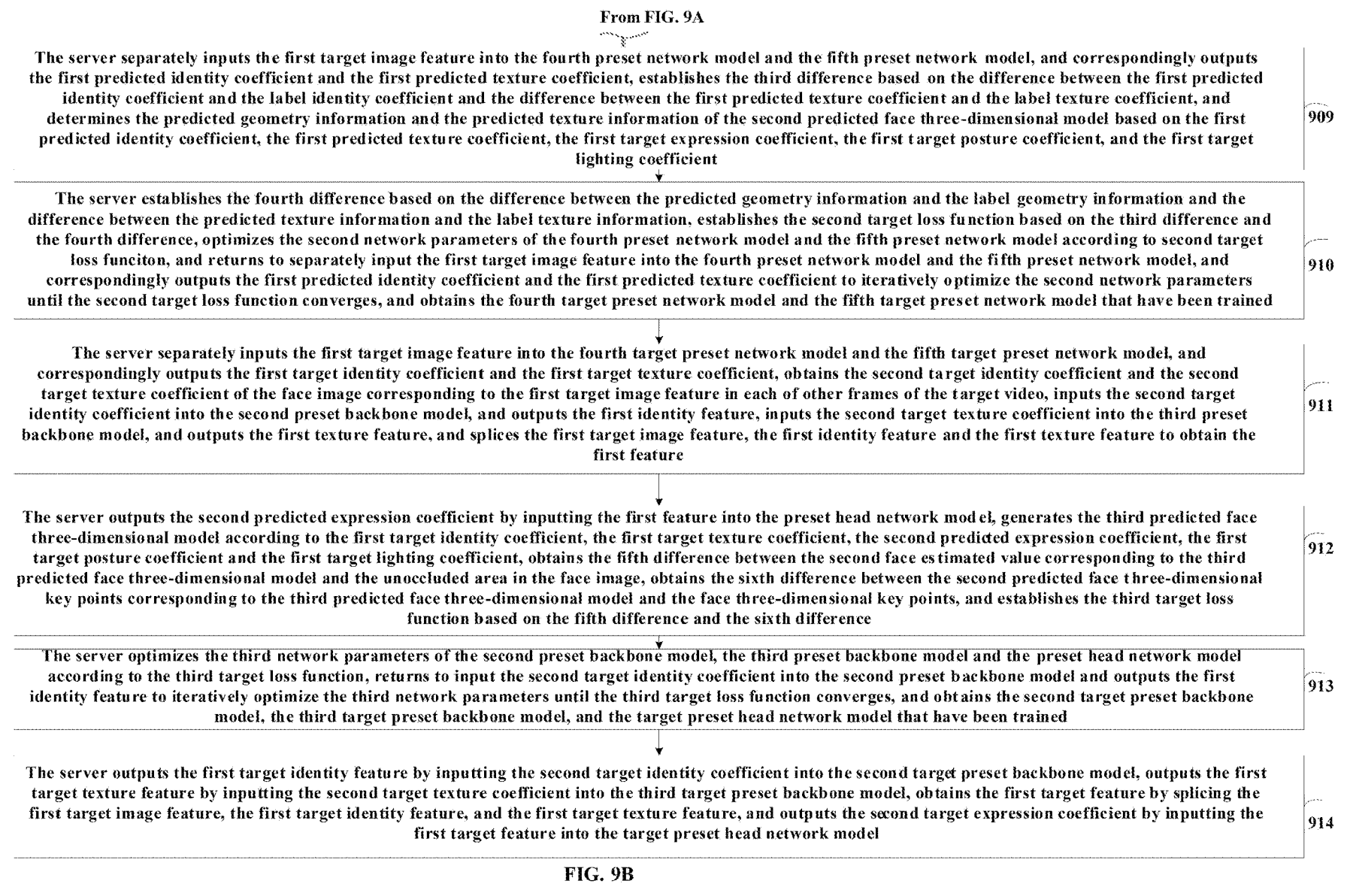

From FIG. 9A

The server separately inputs the first target image feature into the fourth preset network model and the fifth preset network model, and correspondingly outputs the first predicted identity coefficient and the first predicted texture coefficient, establishes the third difference based on the difference between the first predicted identity coefficient and the label identity coefficient and the difference between the first predicted texture coefficient and the label texture coefficient, and determines the predicted geometry information and the predicted texture information of the second predicted face three-dimensional model based on the first predicted identity coefficient, the first predicted texture coefficient, the first target expression coefficient, the first target posture coefficient, and the first target lighting coefficient

909

The server establishes the fourth difference based on the difference between the predicted geometry information and the label geometry information and the difference between the predicted texture information and the label texture information. establishes the second target loss function based on the third difference and the fourth difference, optimizes the second network parameters of the fourth preset network model and the fifth preset network model according to second target loss funciton, and returns to separately input the first target image feature into the fourth preset network model and the fifth preset network model, and correspondingly outputs the first predicted identity coefficient and the first predicted texture coefficient to iteratively optimize the second network parameters until the second target loss function converges, and obtains the fourth target preset network model and the fifth target preset network model that have been trained

910

The server separately inputs the first target image feature into the fourth target preset network model, and correspondingly outputs the first target identity coefficient and the first target texture coefficient, obtains the second target identity coefficient and the second target texture coefficient of the face image corresponding to the first target image feature in each of other frames of the target video, inputs the second target identity coefficient into the second preset backbone model, and outputs the first identity feature, inputs the second target texture coefficient into the third preset identity coefficient into the second preset backbone model, and outputs the first target texture feature, and splices the first target image feature, the first identity feature and the first texture feature to obtain the first feature

911

The server outputs the second predicted expression coefficient by inputting the first feature into the preset head network model, generates the third predicted face three-dimensional model according to the first target identity coefficient, the first target texture coefficient, the second predicted expression coefficient, the first target posture coefficient and the first target lighting coefficient, obtains the fifth difference between the second face estimated value corresponding to the third predicted face three-dimensional model and the unoccluded area in the face image, obtains the sixth difference between the second predicted face three-dimensional key points corresponding to the third predicted face three-dimensional model and the face three-dimensional key points, and establishes the third target loss function based on the fifth difference and the sixth difference

912

The server optimizes the third network parameters of the second preset backbone model, the third preset backbone model and the preset head network model according to the third target loss function, returns to input the second target identity coefficient into the second preset backbone model and outputs the first identity feature to iteratively optimize the third network parameters until the third target loss function converges, and obtains the second target preset backbone model, the third target preset backbone model, and the target preset head network model that have been trained

913

The server outputs the first target identity feature by inputting the second target identity coefficient into the second target preset backbone model, outputs the first target texture feature by inputting the second target texture coefficient into the third target preset backbone model, obtains the first target feature by splicing the first target image feature, the first target identity feature, and the first target texture feature, and outputs the second target expression coefficient by inputting the first target feature into the target preset head network model

INFORMATION PROCESSING METHOD, COMPUTER DEVICE, AND STORAGE MEDIUM

This present application claims the priority to Chinese patent application with application No. 202210370142.1, filed on Apr. 8, 2022, entitled "INFORMATION PROCESS-ING METHOD, DEVICE, COMPUTER DEVICE, AND STORAGE MEDIUM", the priority to Chinese patent appli-cation with application No. 202210370145.5, filed on Apr. 8, 2022, entitled "INFORMATION PROCESSING METHOD, DEVICE, COMPUTER DEVICE, AND STOR-AGE MEDIUM", and the priority to Chinese patent appli-cation with application No. 202210370143.6, filed on Apr. 8, 2022, entitled "INFORMATION PROCESSING METHOD, DEVICE, COMPUTER DEVICE, AND STOR-AGE MEDIUM", the contents of the above applications are incorporated herein by reference.

FIELD

The present application relates to the field of computer vision technology, and specifically to an information pro-cessing method, a device, a computer device, and a storage medium.

BACKGROUND

Face reconstruction is a popular field in computer vision. Reconstructing a face 3D model based on face images is one of fundamental technologies for many face-related applica-tions.

In some cases, the face 3D model is constructed through a parameterized face 3D reconstruction algorithm. The parameterized face 3D reconstruction algorithm takes a parametric face 3D model to acquire prior information as constrains. A problem to reconstruction the face 3D is transformed into an estimation of parameters of a param-eterized face 3D model, which can well cope with the reconstruction of face 3D model in different environments. Moreover, the commonly used parameterized face 3D recon-struction algorithms often do reconstruction by estimating 3DMM (3D Morphable Model) coefficients.

BRIEF DESCRIPTION OF THE DRAWINGS

In order to more clearly illustrate the technical solutions in the embodiments of the present application, the drawings needed to be used in the description of the embodiments will be briefly introduced below. Obviously, the drawings in the following description are only some embodiments of the present application. For those skilled in the art, other draw-ings can also be obtained based on these drawings without exerting creative efforts.

FIG. 3 is a schematic diagram of another flowchart of the information processing method provided by an embodiment of the present application;

FIG. 5 is a schematic diagram of another flow chart of the information processing method provided by the embodiment of the present application;

FIG. 6 is a schematic diagram of another flow chart of the information processing method provided by the embodiment of the present application;

FIG. 8 is a schematic diagram of another flow chart of the information processing method provided by the embodiment of the present application;

FIG. 9A to FIG. 9B is a schematic diagram of another flow chart of the information processing method provided by the embodiment of the present application;

DESCRIPTION

The technical solutions in the embodiments of the present application will be clearly and completely described below with reference to the accompanying drawings in the embodi-ments of the present application. Obviously, the described embodiments are only some of the embodiments of the present application, rather than all of the embodiments. Based on the embodiments in this application, all other embodiments obtained by those skilled in the art without making creative efforts fall within the scope of protection of this application.

In order to implement subsequent operations such as determination of speakers or editing of expressions, it is often necessary to extract expression information of human face in an image. However, 3DMM expression information directly extracted by an image-based parameterized face 3D reconstruction algorithm commonly used mixes with other non-expression information, which results the expression information that is extracted inaccurate and result a poor accuracy of information processing.

The present application provides an information process-ing method, a device, a computer device, and a storage medium. Among them, the information processing method can be applied to an information processing device. The information processing device may be integrated in a com-puter device, and the computer device may be a terminal having an information processing function. The terminal can be, but is not limited to a smart phone, a tablet computer, a notebook computer, a desktop computer, and a smart watch, etc. The computer device can also be a server, and the server can be an independent physical server, or a server cluster or a distributed system composed of a plurality of physical servers, or can also be a cloud server that provides basic cloud computing services. The basic cloud computing services include cloud services, cloud databases, cloud computing, cloud functions, cloud storage, network services, cloud communications, middleware services, domain name services, security services, a content delivery network (CDN), big data and artificial intelligence platforms, etc.

Figures 1, 2:
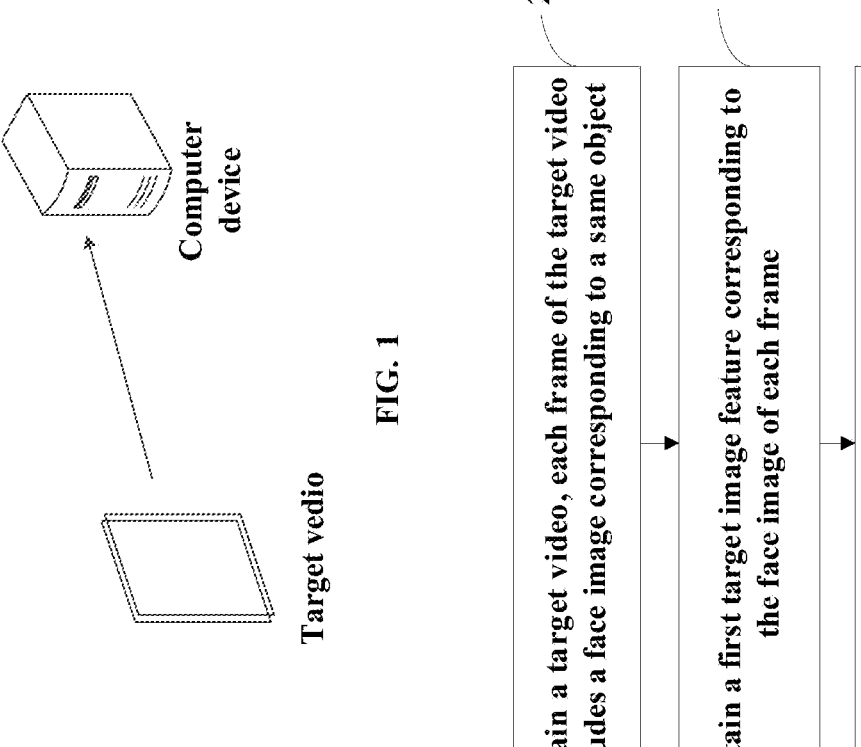
FIG. 1 is a schematic diagram of a scene of an information processing method provided by an embodiment of the present application.
FIG. 2 is a schematic diagram of a flowchart of an information processing method provided by an embodiment of the present application.

Please refer to FIG. 1, which is a schematic diagram of a scene of an information processing method provided by the present application; as shown in the figure, the computer device obtains a target video, each frame of the target video including a face image corresponding to a same object; inputs the face image of each frame into a first target preset backbone model, and outputs a first target image feature; inputs the first target image feature into a first target preset network model, and correspondingly outputs a first target expression coefficient; among them, the first target preset network model is obtained by obtaining shared identity coefficient and shared texture coefficient, and correspondingly performing a prediction optimization training on the expression coefficient.

It should be noted that the schematic diagram of the scene of processing information shown in FIG. 1 is only an example. The scene of processing information described in the embodiment of the present application is to explain a technical solution of the present application more clearly and does not constitute a limitation of the technical solution provided by the present application. The ordinary skilled in the art knows that the technical solution provided by the present application is also applicable to similar technical problems with an evolution of processing information and an emergence of new business scenarios.

Detailed descriptions are provided below.

In this embodiment, descriptions will be made from a perspective of an information processing device. The information processing device may be integrated in a server with a storage unit and a microprocessor installed to have computing capabilities.

Please refer to FIG. 2, which is a schematic diagram of a flowchart of an information processing method provided by an embodiment of the present application. This information processing method can be applied to a computer device (such as the computer device shown in FIG. 14). According to different requirements, the order of the blocks in the flowchart can be changed, and some blocks can be omitted. This information processing method includes: In step 201, obtaining a target video.

Among them, the target video consists of images of a plurality of frames, and each frame of the target video includes a face image corresponding to a same object. The object can be a user, i.e., the embodiment of the present application can determine a video segment in which face images of a same user continuously appears as the target video.

In some embodiments, obtaining the target video may include:

(1) Obtaining an initial video;

(2) Extracting the face image of each frame in the initial video;

(3) Determining the same object by analyzing the face image of each frame, and determining one or more video segments from the initial video, each of the one or more video segments includes at least two frames and the same object appears in each of the at least two frames;

(4) Determining one of the one or more video segments with a number of frames greater than a preset threshold as the target video.

Among them, the initial video may be a video includes one or more human faces that are clear. In this way, a face frame corresponding to each human face in each frame can be determined sequentially through a face detection algorithm and a face tracking algorithm, and the face frame can be labelled in a form of a rectangular box.

Furthermore, each face frame of the same object in the video can be associated to form a face frame sequence. A rule of establishing the face frame sequence is shown in following:

Compare a similarity of face frames in adjacent positions of adjacent frames with a preset threshold. If the similarity is greater than the preset threshold, the face frames in adjacent positions of adjacent frames are identified to be corresponding to the same object. From a second frame in the video, if there is no object that is the same as an object in a previous frame, then the comparing of face frames is ended, and if there is a frame includes an object that is not same as the object in the previous frame, then creates a new face frame sequence, such that at least one face frame sequence corresponding to a same object can be determined.

In order to ensure a quality of the face frame sequence, in one embodiment, the face frames in the face frame sequence can be filtered through the following method: (A) a face frame in the face frame sequence that overlaps with at least one face frame in another face frame sequence can be deleted; (B) a face frame with a size less than a preset size in the face frame sequence can be deleted; (C) a face frame with a blurred face image in the face frame sequence can be deleted. A method for determining the blurred face image can be based on calculating a Laplacian value of an image within the face frame. If the Laplacian value is less than a preset threshold, a blurred face is determined. In this way, each same object corresponds to one face frame sequence, the face frame sequence of which a length is less than a preset number of frames is discarded. For example, a face frame sequence whose length is less than 10 frames is deleted.

In order to ensure an image quality of the face frame, the face frame sequence is smoothed to form a face frame subsequence of which each face frame is a square frame, specifically includes (D) generating a frame center sequence by calculating a center (hereinafter referred to as "frame center") of each face frame in the face frame subsequence and generating a frame side length sequence by calculating a side length (the larger of a length and a width, and is magnified 1.4 times) of each face frame in the face frame subsequence; (E) performing a smoothing filtering on the frame center sequence and the frame side length sequence; (F) obtaining a smoothed face frame sequence by reorganizing face frames according to frame centers and side lengths that have been smoothed. In this way, according to the smoothed face frame sequence, images at corresponding positions are cropped from the corresponding frames in the initial video (if a square frame exceeds an image boundary, fill it with 0 pixel), scaled to a predetermined size, and at least one target video is generated by splicing the images that have been scaled according to an order of the corresponding frames, and each of the at least one target video includes face images corresponding to the same object.

In some embodiments, determining one of the one or more video segments with the number of frames greater than the preset threshold as the target video may include:

(1.1) Determining the one of the one or more video segments with the number of frames greater than the preset threshold as a first target video segment;

(1.2) Obtaining a second target video segment by performing a style transformation on the first target video segment; and (1.3) Determining each of the first target video segment and the second target video segment as the target video.

Among them, the video segment with the number of frames greater than the preset threshold can be determined as the first target video segment. In order to adapt to more application scenarios, a data augmentation can be performed on the first target video segment. In one embodiment, the second target video segment, i.e., the augmented video segment can be obtained by performing a style transformation on the first target video segment, and the style transformation refers to operations that do not change the image size, such as compression, brightness change, hue change and/or changing encoding format. As each of the first target video segment and the second target video segment is determined as the target video, that is, augmentation of the target video is achieved.

The augmented videos can also be further augmented through the above method. In some embodiments, in order to ensure the quality of the target video, the augmented video is not further augmented.

In some embodiments, the face detection algorithm can be used to extract the face image of each frame of the target video and scale the face image of each frame to a predetermined size. This article chooses to scale the face image of each frame to a size of 224*224*3, which is consistent with a size of an input image of a first preset backbone network; and further extract face three-dimensional (3D) key points in the face image. The face 3D key points determine an expression form of a human face. The target video can be converted into a collection of {a face image, face 3D key points}. It should be noted that when some of the augmented video is not clear, the corresponding face 3D key points may not be extracted. In order to solve the above problem, the face 3D key points of an original target video corresponding to the augmented video can be used as face 3D key points corresponding to the augmented video that cannot extract face 3D key points.

In step 202, determining a first target image feature corresponding to the face image of each frame.

In one embodiment, the computer device can input the face image of each frame into a first target preset backbone model, and correspondingly output the first target image feature.

Among them, the first target preset backbone model is used to extract a common feature of the face image of each frame. The first preset backbone model can use a 4-layer ResBlock network structure as a backbone network, in this way, the face image of each frame can be input into the first target preset backbone model and the first target image feature is output. A scale of the first target image feature may be 28*28*128.

The first target preset backbone model is obtained by training the first preset backbone model. Network parameters of the first preset backbone model can be initialized to pre-trained network parameters of ImageNet. Specifically, in order to better understand the embodiments of the present application, here we first explain the training process of the first target preset backbone model, a first target preset network model, a second target preset network model, a third target preset network model, a shared identity coefficient and a shared texture coefficient:

In related technologies, a face 3D model can usually be constructed through a parametric face 3D reconstruction algorithm. It should be noted that the 3DMM is a parametric face 3D model, which mainly consist of two vectors including geometry (which can also be understood as shape) and texture, that is, any new face can be generated by a combination of these vectors, which are expressed by the following formulas:

$$S(\alpha_{id},\alpha_{exp})=\overline{S}+B_{id}*\alpha_{id}+B_{exp}*\alpha_{exp}$$

$$T(\beta_{tex})=\overline{T}+B_{tex}*\beta_{tex}$$

Among them, S represents a face 3D geometry, $\overline{S}$ represents an average face 3D geometry of 3DMM which is a known parameter, $B_{id}$ and $B_{exp}$ respectively represent a base representing identity and a base representing expression in 3DMM, which are configured as known parameters, $\alpha_{id}$ and $\alpha_{exp}$ respectively represent a corresponding identity coefficient and a corresponding expression coefficient. By setting different identity coefficients and expression coefficients, different face 3D geometric shapes can be obtained.

Similarly, T represents a face texture, $\beta_{tex}$ represents a corresponding texture coefficient, $\overline{T}$ represents an average face texture of 3DMM, which is a known parameter, $B_{tex}$ represents a base of texture in 3DMM, which is a preconfigured known parameter, by setting different texture coefficients, different face textures can be obtained.

In particular, in order to project the face 3D model into an image, it is also necessary to know a posture coefficient of the face 3D model relative to a camera, as well as a lighting coefficient of an ambient light lighting model. In this way, as long as the identity coefficient, the texture coefficient, the expression coefficient, the posture coefficient and the lighting coefficient are known, a face 3D model can be generated according to needs. In the embodiment of the present application, in order to improve tasks like active speaker detection and expression recognition, it is necessary to extract the expression coefficient separately. In one embodiment, the expression coefficient defined by 3DMM can be used as a required expression coefficient. For example, under 3DMM, a human face without an expression is defined as a neutral expression, and the neutral expression can be understood as a naturally relaxed face, eyes looking straight ahead, a mouth naturally closed and corners of the mouth flat. A deformation of the face 3D model of a same person under another expression with the neutral expression as a relative reference is the expression. Correspondingly, expression information corresponding to the expression is the expression coefficient that needs to be extracted in the embodiment of the present application. The more accurate the expression coefficient that is extracted is, the better the subsequent processing based on the expression coefficient will be. For example, a determination of a speaker based on the expression coefficient will be more accurate.

However, estimating coefficients is a nonlinear algorithm problem. When only one face image is taken as an input, there are often a plurality of local solutions. That is, there are a plurality of combinations of <identity coefficient, texture coefficient, expression coefficient, posture coefficient, lighting coefficient> that can form a similar face 3D model. For example, a face image with thick lips and a relatively small mouth may correspond to a 3D facial model of a person with the thick lips and the relatively small mouth under the neutral expression, or may correspond to a face 3D model of a person with thin lips and a relatively large mouth with a slightly pouting expression, both of which can achieve similar fitting to the image that is input.

In view of this situation where the plurality of local solutions exists, it is often caused by a coupling of the expression coefficient and other non-expression coefficients, especially the identity coefficient. However, in order to realize a decoupling of the expression coefficient and other non-expression coefficients, the embodiment of the present application presets the identity coefficient and the texture coefficient of the face image corresponding to the same object in each frame of the target video. Since a time interval is short, these face images should have the same identity coefficient and the same texture coefficient, that is, a shared identity coefficient and a shared texture coefficient used by the target video for the same object can be set. The shared identity coefficient can be pre-stored in a shared identity coefficient set, and the shared texture coefficient can be pre-stored in a shared texture coefficient set, face images of different objects correspond to different shared identity coefficients and different shared texture coefficients. The shared identity coefficient set can have a dimension of K*80, where K represents a number of sets participating in training in a database, and 80 represents a dimension of the shared identity coefficient of the 3DMM used in this article. Specifically, one shared identity coefficient can be expressed as an 80-dimensional vector, and the shared identity coefficient set can include K shared identity coefficients, and the K shared identity coefficients together form a K*80-dimensional matrix. The shared identity coefficient can be initialized to Gaussian noise with a mean of 0 and a variance of 0.1, that is, the shared identity coefficient can be intelligently updated.

The shared texture coefficient can be pre-stored in the shared texture coefficient set. The shared texture coefficient set can be K*80 in dimension. K represents a number of sets participating in training in the database. The 80 represents the dimension of the shared texture coefficient of the 3DMM used in this article. Specifically, one shared texture coefficient can be represented as an 80-dimensional vector, and the shared texture coefficient set can include K shared texture coefficients, and the K shared texture coefficients together form a K*80-dimensional matrix. The shared texture coefficient can be initialized to Gaussian noise with a mean of 0 and a variance of 0.1, that is, the shared texture coefficient can be updated intelligently, that is, continuous optimization can be achieved, and the shared identity coefficient set and the shared texture set can be matched according to the face image corresponding to the same object in the target video, and a generic shared identity coefficient and a generic shared texture coefficient of the face image corresponding to the same object in the target video are obtained.

The first target preset network model is obtained by performing a prediction optimization training on the expression coefficient for the first preset network model according to the generic shared identity coefficients and the generic shared texture coefficients of face images of the same object in the target video. For details, please refer to the following training methods:

In some embodiments, a process of the prediction optimization training on the first preset backbone model, the first preset network model, the second preset network model, the third preset network model, the shared identity coefficient and the shared texture coefficient is as follows:

Step 1, generating a first target loss function. In one embodiment, the generating of the first target loss function includes:

(1) Inputting the face image of each frame into the first preset backbone model and correspondingly outputting the first image feature;

(2) Inputting the first image feature into the first preset network model, the second preset network model and the third preset network model separately, and correspondingly outputting a first predicted expression coefficient, a first predicted posture coefficient and a first predicted lighting coefficient;

(3) Obtaining a shared identity coefficient and a shared texture coefficient corresponding to the face image of the same object in the target video;

(4) Generating a first predicted face three-dimensional model according to the shared identity coefficient, the shared texture coefficient, the first predicted expression coefficient, the first predicted posture coefficient, and the first predicted lighting coefficient;

(5) Obtaining a first difference between a first face estimated value corresponding to the first predicted face three-dimensional model and a face image on the un-occluded area of the face image;

(6) Obtaining a second difference between first predicted face three-dimensional key points corresponding to the first predicted face three-dimensional model and face three-dimensional key points in the face image;

(7) Establishing a constraint relationship between the shared identity coefficient, the shared texture coefficient, and the first predicted expression coefficient through a regularization loss function;

(8) Generating a corresponding first target loss function according to the first difference, the second difference, and the constraint relationship;

Step 2, performing a training according to the first target loss function. In one embodiment, the training process is as follows:

Performing an iterative optimization on first network parameters of the first preset backbone model, the first preset network model, the second preset network model, the third preset network model, the shared identity coefficient, and the shared texture coefficient according to the first target loss function, until the first target loss function converges, and obtaining the first target preset backbone model, a first target preset network model, a second target preset network model, a third target preset network model, and the shared identity coefficient and the shared texture coefficient that have been trained.

Among them, the first preset backbone model is used to predict the common feature of the face image of each frame, the first preset network model is used to predict the expression coefficient, the second preset network model is used to predict the posture coefficient, and the third preset network model is used to predict the lighting coefficient, the shared identity coefficient and the shared texture coefficient are used to represent the identity coefficient and the texture coefficient of a specific target object in the target video, and in the target video with the same target object, the shared identity coefficient and the shared texture coefficient corresponding to the face image of each frame are the same, so as to introduce additional constraint relationship on the identity coefficient and the texture coefficient to remove ambiguity.

The first preset network model, the second preset network model, and the third preset network model can have similar structures, that is, they can adopt a 4-layer ResBlock structure and use a fully connected layer (FC layer) structure at the end. Based on this, each first image feature can be input into the first preset network model, the second preset network model and the third preset network model separately, and the first predicted expression coefficient, the first predicted posture coefficient and the first predicted lighting coefficient that are predicted can be output. Since the first preset network model, the second preset network model, and the third preset network model have not completed training yet, the first predicted expression coefficient, the first predicted posture coefficient and the first predicted lighting coefficient are not optimal values.

In the related technology, since there is no "true value of coefficient" as a label for recursive training, it is impossible to directly measure whether the first predicted expression coefficient, the first predicted posture coefficient, and the first predicted lighting coefficient that are predicted are good or bad. In order to solve the above problem, the embodiment of the present application can adopt an indirect measurement method, that is, the shared identity coefficient and the shared texture coefficient corresponding to the face image of the same object in the target video can be first obtained, and then based on the shared identity coefficient, the shared texture coefficient, and the first predicted expression coefficient, the first predicted posture coefficient and the first predicted lighting coefficient, generate the first predicted face 3D model (including the face 3D geometry and the face texture).

Further, the first face estimated value is a 2-dimensional image obtained by rendering a current estimated value (geometry, texture) of the constructed first predicted face three-dimensional model through a differentiable renderer.

The first difference between the first face estimated value corresponding to the first predicted face 3D model and the un-occluded area in the face image (i.e., the original image) can be determined. The greater the first difference is, the less closer the first face estimated value is to the face image, and correspondingly, it indicates that the first image feature, the first predicted expression coefficient, the first predicted posture coefficient, the first predicted lighting coefficient, the shared identity coefficient, and the shared texture coefficient are less accurate, on the contrary, the smaller the first difference is, it indicates that the first face estimated value is closer to the face image, and correspondingly, it indicates that the first image feature, the first predicted expression coefficient, the first predicted posture coefficient, and the first predicted lighting coefficient, the shared identity coefficient, and the shared texture coefficient are more accurate. The first difference can be calculated by the following formula:

$$L_{rec} = \frac{\sum_{i \in M} M_i \|I_i - \hat{I}_i\|}{\sum_{i \in M} M_i}$$

Among them, $L_{rec}$ represents the first difference, $M_i$ represents the un-occluded area, $I_i$ represents the i-th face image, and $\hat{I}_i$ represents the i-th first face estimated value. The first difference is calculated through the above formula. The above formula can be understood as a loss function of the first difference.

When determining the first difference corresponding to the first predicted face 3D model, the reason why the un-occluded area M is introduced is that the 3DMM model cannot express an occlusion, resulting in that all the "face image estimated values constructed by the coefficient estimated values" are complete faces. If the "truth value of the face image" is not a complete face, such as wearing sunglasses, a difference between the two should not be compared at an occluded part, so we choose to use M to remove an occluded part and only compare the un-occluded part of the face. Therefore, during training, some common occlusions can be attached to the face image online based on the face 3D key points of the face image. For example, an image of sunglasses is scaled and attached to the human eyes according to a scale of key points of the human eyes, resulting in augmentations at image levels such as partial occlusion of the face image, and enhancing a robustness of the deep neural network to face occlusion.

It is also possible to obtain the second difference between the first predicted face three-dimensional key points corresponding to the first predicted face three-dimensional model and the face three-dimensional key points of a real face image. Specifically, vertices of semantic positions of the face 3D key points used in the first predicted face 3D model can be projected onto the image to obtain the current estimated value k of the face 3D key points (first predicted face 3D key points), calculate the second difference between the current estimated value $\hat{k}$ and a true value K of the face three-dimensional key points of the real face image in the un-occluded area M. The larger the second difference is, the less closer the first predicted face three-dimensional key points are to the real face three-dimensional key points, and correspondingly, it means that the first preset backbone model, the first predicted expression coefficient, the first predicted posture coefficient, the first predicted lighting coefficient, the shared identity coefficient and the shared texture coefficient are less accurate; on the contrary, the smaller the second difference is, the closer the first predicted face three-dimensional key points are to the real face three-dimensional key points, and correspondingly, it means that the first preset backbone model, the first predicted expression coefficient, the first predicted posture coefficient, the first predicted lighting coefficient, the shared identity coefficient and the shared texture coefficient are more accurate. The second difference can be calculated by the following formula:

$$L_{lan} = \frac{\sum_{i \in M} w_i \|k_i - \hat{k}_i\|}{N}$$

Among them, $L_{lan}$ represents the second difference, and $w_i$ represents a weight. Each key point has a different weight, that is, when calculating the loss function, errors of some key points are more important than errors of other key points. The values of these weights are predefined in technical implementation. $k_i$ represents a true value of the i-th face 3D key point, and $\hat{k}_i$ represents the current estimated value of the i-th face 3D key point of the first predicted face 3D model. N represents a number of key points, for example, 68. The second difference is calculated through the above formula, which can be understood as the loss function of the second difference.

A constraint relationship between the shared identity coefficient, the shared texture coefficient, and the first predicted expression coefficient can also be established through a regularization loss function to constrain the constraint relationship between the shared identity coefficient, the shared texture coefficient and the first predicted expression coefficient not to deviate too much from the mean of zero, it can be calculated by the following formula:

$$L_{reg} = \alpha_d \|\hat{d}\| + \alpha_t \|\hat{t}\| + \alpha_e \|\hat{e}\|$$

Among them, $\alpha_d$, $\alpha_t$, and $\alpha_e$ represent preset weight coefficients used to balance various loss functions, $\hat{d}$ represents the shared identity coefficient, $\hat{t}$ represents the shared texture coefficient and $\hat{e}$ represents the first predicted expression coefficient. The above formula can be understood as a constrained loss function.

A corresponding first target loss function can be generated according to the first difference, the second difference, and the constraint relationship.

Finally, the iterative optimization is performed on the first network parameters of the first preset backbone model, the first preset network model, the second preset network model, the third preset network model, the shared identity coefficient, and the shared texture coefficient according to the first target loss function, until the first target loss function converges, and the first target preset backbone model, first target preset network model, the second target preset network model, the third target preset network model, the shared identity coefficient, and the shared texture coefficient that have been trained are obtained. That is, the first network parameters of the first preset backbone model, the first preset network model, the second preset network model, the third preset network model, the shared identity coefficient, and the shared texture coefficient can be optimized using a stochastic gradient descent algorithm according to the first target loss function, and repeatedly performing a generation of the first target loss function for multiple times, through the first target loss function that is constantly updated, the first network parameters of the first preset backbone model, the first preset network model, the second preset network model, the third preset network model, the shared identity coefficient, and the shared texture coefficient are iteratively optimized until the first target loss function converges, that is, the loss function converges. Specifically, the first target loss function of the first difference, the second difference, and the constraint relationship can be established through the following formula, as follows:

$$L = \lambda_{rec} L_{rec} + \Delta_{lan} L_{lan} + \Delta_{reg} L_{reg}$$

$\lambda_{rec}$, $\lambda_{lan}$, and $\lambda_{reg}$ represent preset weight coefficients used to balance various loss functions, L represents the first target loss function. Based on the first target loss function, the first network parameters of the first preset backbone model, the first preset network model, the second preset network model, the third preset network model, the shared identity coefficient, and the shared texture coefficient are optimized according to the stochastic gradient descent algorithm, and repeatedly input the face image of each frame that is different into the first preset backbone model, and output the first image features, iteratively calculate a first target loss and perform an iterative adjustment until the first target loss converges, and obtain the trained first target loss function that is converged, and obtain the first target preset backbone model, the first target preset network model, the second target preset network model, the third target preset network model, the shared identity coefficient, and the shared texture coefficient that have been trained.

In this way, the first target backbone model that has been trained can output accurate first target image feature based on the face image. The first target preset network model, the second target preset network model, and the third target preset network model that have been trained can output accurate expression coefficient, accurate posture coefficient, and accurate lighting coefficient.

First network models corresponding to the first network parameters mentioned above includes an E-Net sub-model, a shared identity coefficient set sub-model and a shared texture coefficient set sub-model. Among them, the E-Net sub-model may include the first preset backbone model, the first preset network model, the second preset network model and the third preset network model that are mentioned above, the input thereof may be the face image, and the output may be the first predicted expression coefficient, the first predicted posture coefficient, and the first predicted lighting coefficient that are mentioned above. The input of the shared identity coefficient set sub-model is a sequence number k, and the output is the predicted shared identity coefficient. The input of the shared texture coefficient set sub-model is the sequence number k, and the output is the predicted shared texture coefficient. Among them, the sequence number k that is input is used to select which one of the shared identity coefficient set that is initialized/the shared texture coefficient set that is initialized is extracted to participate in a current round of training of a first network model. Put the shared identity coefficient/the shared texture coefficient updated by training back into a corresponding set, and update the shared identity coefficient set/the shared texture coefficient set. Other shared identity coefficients/ other shared texture coefficients that are not selected do not participate in this round of training of the first network model, and corresponding values in the shared identity coefficient set/the shared texture coefficient set remain unchanged. In one embodiment, batch sampling is used for training, that is, in each round of training, a plurality of {face image, sequence number k corresponding to the face image} participate in the above process at the same time. Therefore, in each round of training, there are a plurality of shared identity coefficients within the shared identity coefficient set/a plurality of shared texture coefficients within the shared texture coefficient set are updated. A value distribution of the identity coefficient and the texture coefficient conforms to multi-dimensional Gaussian distribution, and its value range is between [−0.1, 0.1]. Therefore, Gaussian noise with a mean of 0 and a variance of 0.1 can be selected for initializing the shared identity coefficient in the shared identity coefficient set/the shared texture coefficient in the shared texture coefficient set. The first network model is trained based on the above training process, that is, according to the first target loss function, the first network parameters are iteratively optimized for the E-Net sub-model, the shared identity coefficient set sub-model and the shared texture coefficient set sub-model until the first target loss function converges, and the E-Net sub-model, the shared identity coefficient set sub-model, and the shared texture coefficient set sub-model that have trained are obtained.

In step 203, obtaining a first target expression coefficient corresponding the first target image feature.

In one embodiment, the computer device can input the first target image feature into the first target preset network model and output the first target expression coefficient.

Among them, the first target image feature can be input into the first target preset network model that has been trained to output an accurate first target expression coefficient. Since the additional constraint of the shared identity coefficient and the shared texture coefficient is introduced, that is, the identity coefficient and the texture coefficient are pre-defined, a decoupling of the first target expression coefficient and other non-expression coefficients is achieved, and an accuracy of the first target expression coefficient is improved.

As can be seen from the above, the embodiment of the present application obtains the target video, and each frame of the target video including the face image corresponding to the same object; inputs the face image of each frame into the first target preset backbone model, and outputs the first target image feature; inputs the first target image feature into the first target preset network model and outputs the first target expression coefficient; among them, the first target preset network model is obtained by obtaining the shared identity coefficient and the shared texture coefficient, and performing the prediction optimization training on the expression coefficient. By decoupling the first target expression coefficient from the non-expression coefficient, compared to the solution of directly extracting the expression coefficient through the 3DMM method, the embodiment of the present application greatly improves the accuracy of the extracted expression coefficient.

In this embodiment, the information processing device is specifically integrated in a server as an example for description. Please refer to the following description for details.

Please refer to FIG. 3, which is schematic diagram of another flowchart of an information processing method provided by an embodiment of the present application. The process of the method may include:

In step 301, the server obtains an initial video, extracts a face image of each frame in the initial video, and determines one or more video segments from the initial video, each of the one or more video segments includes at least two frames and the same object appears in each of the at least two frames.

Among them, the initial video may be a video includes one or more human faces that are clear. The server can sequentially extract the face image of each frame in the initial video through the face detection algorithm and the face tracking algorithm, determine the corresponding user identity information through the face image, and then determine a user (i.e., an object) corresponding to the face image through the user identity information.

In step 302, the server determines one of the one or more video segments with a number of frames greater than a preset threshold as a first target video segment, obtains a second target video segment by performing a style transformation on the first target video segment, and determines each of the first target video segment and the second target video segment as the target video.

Among them, in order to ensure the subsequent training effect of the target video, the video segment with insufficient number of frames need to be deleted. The preset threshold is used to define whether the number of frames reaches a critical value that meets the training effect, such as 50 frames. In this way, an video segment with a number of frames greater than the preset threshold may be determined as a first target video.

In order to adapt to more application scenarios, the first target video segment can be augmented. In one embodiment, the style transformation can include operations of compression, brightness change, hue change, and/or encoding format change without changing a size of the image, with this, performing the style transformation on the first target video segment, and obtaining the second target video segment, i.e., the augmented video segment, and determining the first target video segment and the second target video segment as target videos, that is, augmentation of the target video is achieved.

In order to ensure the quality of the target video, the augmented video will not be further augmented.

For the convenience of subsequent processing, the face detection algorithm can be used to extract the face image of each frame of the target video, and further extract the face 3D key points in the face image. The face 3D key points determine an expression form of a human face. The target video can be converted into a collection of {a face image, face 3D key points}. It should be noted that when some of the augmented video is not clear, the corresponding face 3D key points may not be extracted. In order to solve the above problem, the face 3D key points of an original target video corresponding to the augmented video can be used as the face 3D key points that cannot be extracted.

In step 303, the server obtains the shared identity coefficient set and the shared texture coefficient set, matches the shared identity coefficient set and the shared texture coefficient set according to the face image of the same object in the target video, and obtains the corresponding shared identity coefficient and the corresponding shared texture coefficient.

In order to realize the decoupling of the expression coefficient and other non-expression coefficients, the embodiments of the present application can set each frame of the target video to be the face image corresponding to the same object in advance. Since a time interval is very short, these face images all have the same identity coefficient and the same texture coefficient, that is, the target video of the same object can be set to use the shared identity coefficient and the shared texture coefficient. The shared identity coefficient may be pre-stored in the shared identity coefficient set, and the shared texture coefficient may be pre-stored in the shared texture coefficient set. There may be K sets, the same object shares the same shared identity coefficient and shared texture coefficient, and the face images of different objects correspond to different shared identity coefficients and shared texture coefficients. The shared identity coefficient set can be K*80 dimensions, K is a number of sets participating in training in the database, and 80 is the dimensions of the shared identity coefficient of the 3DMM used in this article. The shared identity coefficient can be initialized to Gaussian noise with a mean of 0 and a variance of 0.1. that is, the shared identity coefficient can be adjusted intelligently along with the learning process.

The shared texture coefficient can be pre-stored in the shared texture coefficient set, and the shared identity coefficient set and the shared texture coefficient set are matched according to the face image corresponding to the same object in the target video, and the corresponding shared identity coefficient and shared texture coefficient are obtained. The shared texture coefficient set can be K*80 in dimension, K is the number of sets participating in training in the database, and 80 is the dimension of the shared texture coefficient of the 3DMM used in this article. The shared texture coefficient can be initialized to Gaussian noise with a mean of 0 and a variance of 0.1. that is, the shared texture coefficient can be intelligently adjusted along with the learning process. It should be noted that the shared identity coefficient and the shared texture coefficient can be continuously optimized with training.

Figure 4A:
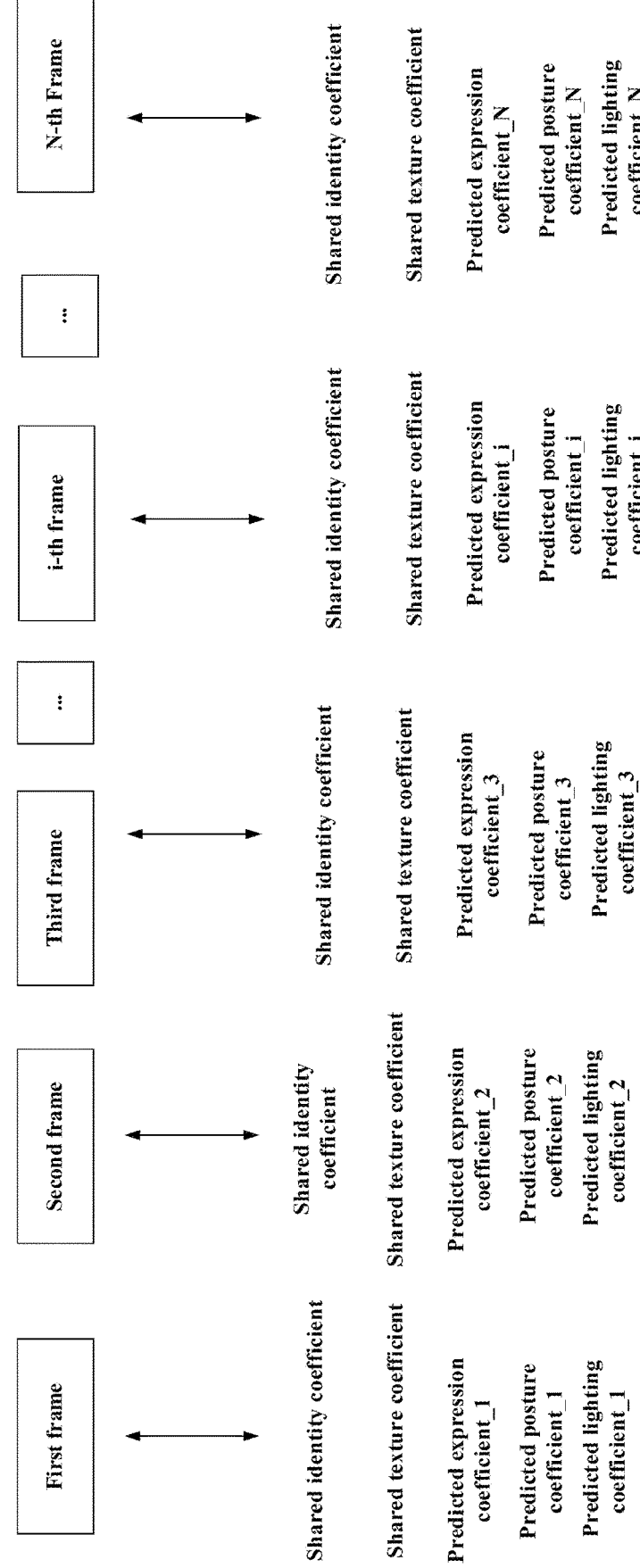
FIG. 4A is a schematic diagram of a scene of an infor-mation processing method provided by an embodiment of the present application.

For example, as shown in FIG. 4A, the face image of each frame of the target video has the same shared identity coefficient and shared texture coefficient, and each frame has an independent predicted expression coefficient, an independent predicted posture coefficient, and an independent predicted lighting coefficient.

By introducing the additional constraint relationship on the identity coefficient and the texture coefficient to eliminate ambiguities, the decoupling of the expression coefficient and non-expression coefficients is achieved.

In step 304, the server inputs the face image of each frame into the first preset backbone model, outputs the first image feature, and inputs the first image feature into the first preset network model, the second preset network model, and the third preset network model separately, and correspondingly outputs the first predicted expression coefficient, the first predicted posture coefficient, and the first predicted lighting coefficient.

Figure 4B:
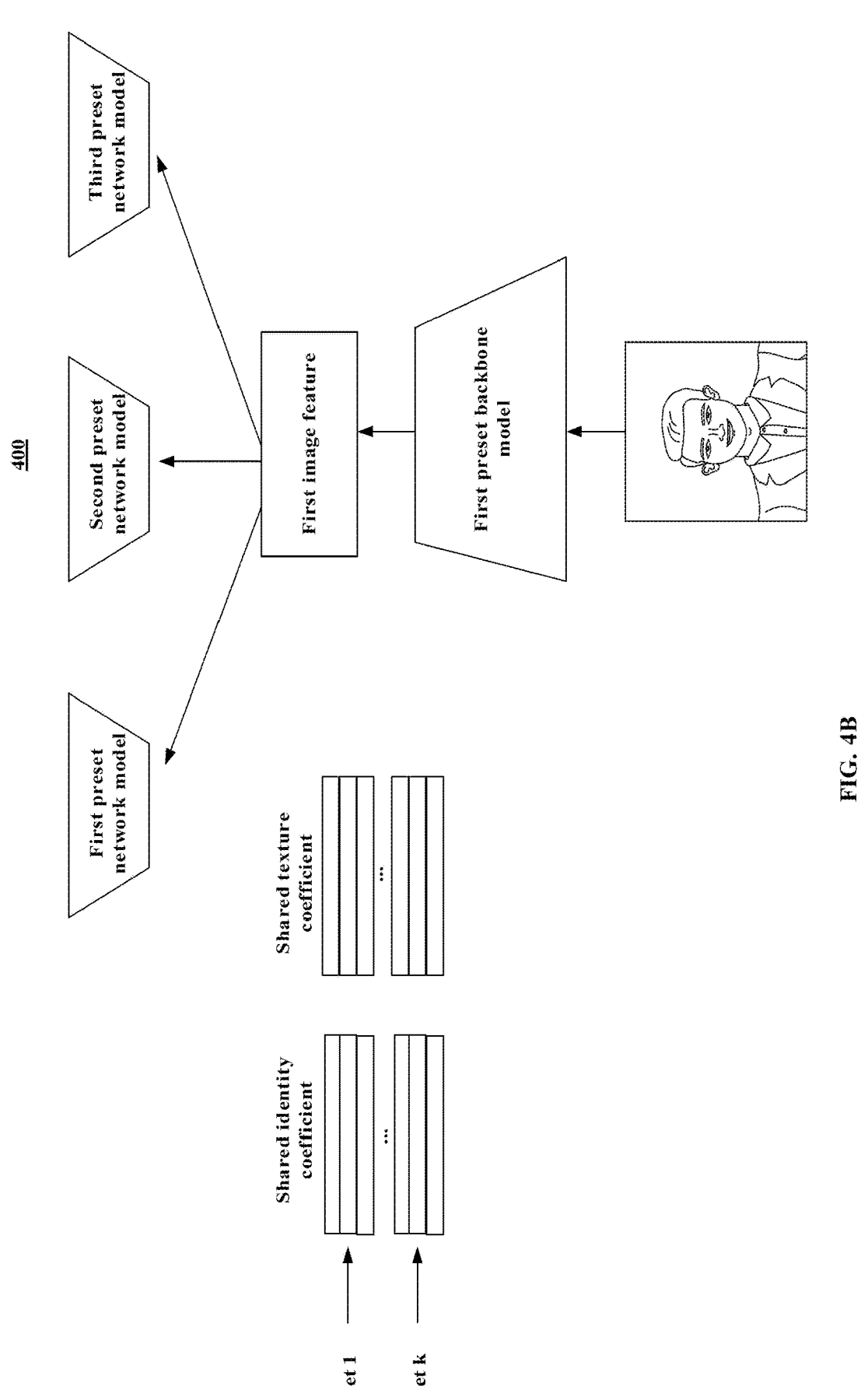
FIG. 4B is a schematic diagram of a framework of the information processing system provided by an embodiment of the present application.

Please refer to FIG. 4B, FIG. 4B is a schematic diagram of a framework 400 of the information processing system provided by the embodiment of the present application. The first image feature represents the common feature of the face image in each frame. The first preset backbone model can use a 4-layer ResBlock network structure as a backbone network. The server can input the face image of each frame into the first preset backbone model in sequentially, and output the first image feature corresponding to the face image of each frame. The scale of the first image feature can be 28*28*128.

Among them, please continue to refer to FIG. 4B, the first preset network model is used to predict the expression coefficient, the second preset network model is used to predict the posture coefficient, and the third preset network model is used to predict the lighting coefficient. The first preset network model, the second preset network model, and the third preset network model can have similar structures, that is, they can use the 4-layer ResBlock structure and a fully connected layer structure at the end. In one implementation, the first preset network model, the second preset network model, and the third preset network model can also adopt different network structures, and the examples here are not intended to be specific limitations. Based on this, each image feature can be input into the first preset network model, the second preset network model and the third preset network model separately, and correspondingly output the first predicted expression coefficient, the first predicted posture coefficient, and the first predicted lighting coefficient that are predicted. Since the first preset network model, the second preset network model, and the third preset network model have not been trained completely, the first predicted expression coefficient, the first predicted posture coefficient, and the first predicted lighting coefficient are not optimal values.

In step 305, the server generates the first predicted three-dimensional model based on the shared identity coefficient, the shared texture coefficient, the first predicted expression coefficient, the first predicted posture coefficient, and the first predicted lighting coefficient.

Among them, please continue to refer to FIG. 4B, in the related technology, since there is no "true value of coefficient" as a label for recursive training, it is impossible to directly measure whether the first predicted expression coefficient, the first predicted posture coefficient and the first predicted lighting coefficient are good or bad. In order to solve the above problem, embodiments of the present application can use indirect measurement, that is, the shared identity coefficient and the shared texture coefficient corresponding to the face image of the same object in the target video can be first obtained, and then generate the first predicted face three-dimensional model (including face 3D geometry and face texture) based on the shared identity coefficient, the shared texture coefficient, the first predicted expression coefficient, the first predicted posture coefficient, and the first predicted lighting coefficient.

In step 306, the server obtains the first difference between the first face estimated value corresponding to the first predicted face three-dimensional model and the un-occluded area in the face image, obtains the second difference between the first predicted face three-dimensional key points corresponding to the first predicted face three-dimensional model and the face three-dimensional key points, establishes the constraint relationship between the shared identity coefficient, the shared texture coefficient, and the first predicted expression coefficient through the regularization loss function, generating the corresponding first target loss function according to the first difference, the second difference, and the constraint relationship, performing the optimization on first network parameters of the first preset backbone model, the first preset network model, the second preset network model, the third preset network model, the shared identity coefficient, and the shared texture coefficients according to the first target loss function.

Among them, the first face estimated value is a 2-dimensional image obtained by rendering the current estimated value (geometry, texture) of the constructed first predicted face three-dimensional model by a differentiable renderer.

The first difference between the first face estimated value corresponding to the first predicted face three-dimensional model and the un-occluded area in the face image (i.e., the original image) can be determined. During training, some common occlusions can be attached to the face image online based on the face 3D key points of the face image. For example, an image of sunglasses can be scaled and attached to the human eyes according to the scale of the key points of the human eyes, resulting in augmentations at image levels such as partial occlusion of the face image, and enhancing the robustness of the deep neural network to face occlusion. The greater the first difference is, the less closer the first face estimated value is to the face image, correspondingly, it means that the first image feature, the first predicted expression coefficient, the first predicted posture coefficient, the first predicted lighting coefficient, the shared identity coefficient, and the shared texture are inaccurate. On the contrary, the smaller the first difference is, the closer the first face estimated value is to the face image, correspondingly, it means that the first image feature, the first predicted expression coefficient, the first predicted pose coefficient, the first predicted lighting coefficient, the shared identity coefficient, and the shared texture coefficient are more accurate. The first difference can be calculated by the following formula:

$$L_{rec} = \frac{\sum_{i \in M} M_i \|I_i - \hat{I}_i\|}{\sum_{i \in M} M_i}$$

Among them, $L_{rec}$ represents the first difference, $M_i$ represents the un-occluded area, $I_i$ represents the i-th face image, and $\hat{I}_i$ represents the i-th first face estimated value. The first difference is calculated through the above formula. The above formula can be understood as the loss function of the first difference.

The second difference between the first predicted face three-dimensional key points corresponding to the first predicted face three-dimensional model and the face three-dimensional key points of the real face image can also be obtained. Specifically, the vertices of the semantic positions of the face 3D key points used in the first predicted 3D face model can be projected onto the image to obtain the current estimated value $\hat{k}$ of the face 3D key points (the first predicted face 3D key points), the second difference between the current estimated value $\hat{k}$ and the true value K of the face three-dimensional key points of the real face image in the un-occluded area M is calculated. The greater the second difference is, the less closer the first predicted face three-dimensional key points that are predicted are to the real face three-dimensional key points, correspondingly, it means that the first image feature, the first predicted expression coefficient, the first predicted posture coefficient, the first predicted lighting coefficient, the shared identity coefficient, and the shared texture coefficient are less accurate, on the contrary, the smaller the second difference is, it means that the closer the first predicted face three-dimensional key points that are predicted are to the real face three-dimensional key points, correspondingly, it indicates that the first image feature, the first predicted expression coefficient, the first predicted posture coefficient, the first predicted lighting coefficient, the shared identity coefficient, and the shared texture coefficient are more accurate. The calculation method of the second difference can be calculated by the following formula:

$$L_{lan} = \frac{\sum_{i \in M} w_i \|k_i - \hat{k}_i\|}{N}$$

Among them, $L_{lan}$ represents the second difference, $w_i$ represents a weight, each key point has a different weight, that is, when calculating the loss function, the weights of some key points are more important than the weights of other key points. The values of these weights are predefined in technical implementation. $k_i$ represents the true value of the i-th face 3D key point, and $\hat{k}_i$ represents the current estimated value of the i-th face 3D key point of the first predicted face 3D model. The N represents the number of key points, for example, 68. The second difference is calculated through the above formula, which can be understood as the loss function of the second difference.

The constraint relationship between the shared identity coefficient, the shared texture coefficient and the first predicted expression coefficient can also be established through THE regularization loss function, and constraints the constraint relationship between the shared identity coefficient, the shared texture coefficient, and the first predicted expression coefficient not to deviate too much from the zero mean value. It can be calculated by the following formula:

$$L_{reg} = \alpha_d \|\hat{d}\| + \alpha_t \|\hat{t}\| + \alpha_e \|\hat{e}\|$$

Among them, $\alpha_d$, $\alpha_t$ and $\alpha_e$ are preset weight coefficients used to balance various loss functions, $\hat{d}$ represents the shared identity coefficient, $\hat{t}$ represents the shared texture coefficient and $\hat{e}$ represents the first predicted expression coefficient. The above formula can be understood as a constrained loss function.

A corresponding first target loss function can be generated according to the first difference, the second difference, and the constraint relationship.

Finally, the first network parameters of the first preset backbone model, the first preset network model, the second preset network model, the third preset network model, the shared identity coefficient, and the shared texture coefficient are optimized according to the first target loss function.

In step 307, the server returns to the step of inputting the face image of each frame into the first preset backbone model and outputting the first image feature to iteratively optimize the first network parameters until the first target loss function converges, and obtains the first target preset backbone model, the first target preset network model, the second target preset network model, the third target preset network model, the shared identity coefficient and the shared texture coefficient that have been trained.

Among them, the server returns to the step of inputting the face image of each frame into the first preset backbone model and outputting the first image feature to iteratively optimize the first network parameters until the first target loss function converges, and obtains the first target preset backbone model, the first target preset network model, the second target preset network model, the third target preset network model, the shared identity coefficient and the shared texture coefficient that have been trained.

That is, the first network parameters of the first preset backbone model, the first preset network model, the second preset network model, the third preset network model, the shared identity coefficient and the shared texture coefficient can be optimized using the stochastic gradient descent algorithm according to the first target loss function, and repeatedly optimizing multiple times until the first target loss function converges, that is, the loss function converges. Specifically, the first target loss function of the first difference, the second difference and the constraint relationship can be established through the following formula, as follows:

$$L = \lambda_{rec} L_{rec} + \lambda_{lan} L_{lan} + \lambda_{reg} L_{reg}$$

$\lambda_{rec}$, $\lambda_{lan}$, and $\lambda_{reg}$ represent preset weight coefficients used to balance various loss functions, L represents the first target loss function. Based on the first target loss function, the first network parameters of the first preset backbone model, the first preset network model, the second preset network model, the third preset network model, the shared identity coefficient, and the shared texture coefficient can be optimized according to the stochastic gradient descent algorithm, and repeatedly input the face image of each frame that is different into the first preset backbone model, and output the first image features, iteratively calculate a first target loss and perform an iterative adjustment until the first target loss converges, and obtain the trained first target loss function that is converged, and obtain the first target preset backbone model, the first target preset network model, the second target preset network model, the third target preset network model, the shared identity coefficient, and the shared texture coefficient that have been trained.

In this way, the first target backbone model that has been trained can output accurate first target image feature based on the face image. The first target preset network model, the second target preset network model, and the third target preset network model that have been trained can output accurate expression coefficient, accurate posture coefficient, and accurate lighting coefficient, both the shared identity coefficient and the shared texture coefficient are accurate coefficients.

In step 308, the server can input the face image of each frame into the first target preset backbone model, and output the first target image feature, input the first target image feature into the first target preset network model and output a first target expression coefficient.

Among them, the server can input the face image of each frame into the first target preset network model and output the first target image feature, input the first target image feature into the first target preset network model and output the first target expression coefficient that is accurate. Since the additional constraint of the shared identity coefficient and the shared texture coefficient is introduced, i.e., the identity coefficient and the texture coefficient are pre-defined, the decoupling of the first target expression coefficient and other non-expression coefficients is achieved, the accuracy of the first target expression coefficient is improved.

As can be seen from the above, the embodiment of the present application obtains the target video, and each frame of the target video including the face image corresponding to the same object; inputs the face image of each frame into the first target preset backbone model, and outputs the first target image feature; inputs the first target image feature into the first target preset network model, and correspondingly output the first target expression coefficient; among them, the first target preset network model is obtained by obtaining the shared identity coefficient and the shared texture coefficient, and performing the corresponding prediction optimization training on the expression coefficient. By decoupling the first target expression coefficient from non-expression coefficients, compared to the solution of directly extracting the expression coefficient through the 3DMM method, the embodiment of the present application greatly improves the accuracy of the extracted expression coefficient.

Please refer to FIG. 5, FIG. 5 is a schematic diagram of a flowchart of an information processing method provided by an embodiment of the present application. The information processing method includes:

In step 501, obtaining the target video.

In step 502, inputting the face image of each frame into the first target preset backbone model and outputting the first target image feature.

For descriptions of steps 501-502, please refer to the relevant descriptions of steps 201-202, which will not be described again here.

In step 503, separately inputting the first target image feature into the first target preset network model, the second target preset network model and the third target preset network model, and correspondingly outputting the first target expression coefficient, the first target posture coefficient, and the first target lighting coefficient.

Among them, the first target image feature can be input into the first target preset network model that has been trained to output the accurate first target expression coefficient. Input the first target image feature into the second target preset network model that has been trained and output the accurate first target posture coefficient. Input the first target image feature into the third target preset network model that has been trained and output the accurate first target lighting coefficient. Among them, the determination of the first target expression coefficient, the first target posture coefficient and the first target lighting coefficient is not restricted in order, and can be processed in a certain order or simultaneously. Since the additional constraint of the shared identity coefficient and the shared texture coefficient is introduced, that is, the identity coefficient and the texture coefficient are pre-defined, the decoupling of the first target expression coefficient and other non-expression coefficients is achieved, and the accuracy of the first target expression coefficient is improved.

In step 504, separately inputting the first target image feature into a fourth target preset network model and a fifth target preset network model, and correspondingly output the first target identity coefficient and the first target texture coefficient.

Among them, because for the face image not in a training set, only the expression coefficient, the posture coefficient, and the lighting coefficient can be predicted, and for the face image not in the training set, the corresponding identity coefficient cannot be found in the shared identity coefficient set and the corresponding texture coefficient cannot be found in the shared texture coefficient set. A first target identity coefficient output through the fourth target preset network model that has been trained and a first target texture coefficient output through the fifth target preset network model that has been trained can complement an ability of the first target preset network model and enable the first target preset network model to predict the identity coefficient and the texture coefficient.

The fourth target preset network model and the fifth target preset network model are respectively obtained by performing a corresponding prediction optimization training on the identity coefficient and texture coefficient after determining the first target expression coefficient, the first target posture coefficient, and the first target lighting coefficient. The fourth preset network model before training is used to predict the identity coefficient, and the fifth preset network model is used to predict the texture coefficient. The fourth preset network model and the fifth preset network model can have a similar structure, that is, they can adopt a 4-layer ResBlock structure and a fully connected layer (FC layer) structure at the end, based on this, the first target image feature can be input into the fourth preset network model and the fifth preset network model separately, and output the first predicted identity coefficient and the first predicted texture coefficient that are predicted. Since the fourth preset network model and the fifth preset network model have not finished training yet, the first predicted identity coefficient and the first predicted texture coefficient are not optimal value, so the fourth preset network model and the fifth preset network model need to be trained.

In some embodiments, the process of prediction optimization training on the fourth preset network model and the fifth preset network model is as follows:

(1) Determining the label geometry information and the label texture information based on the shared identity coefficient and the shared texture coefficient that have been trained;

(2) Iteratively optimizing the fourth preset network model and the fifth preset network model based on the label geometry information and the label texture information to obtain the fourth target preset network model and the fifth target preset network model that have been trained.

Among them, the label geometry information and the label texture information can be calculated according to the following formula:

$$S(\alpha_{id}, \alpha_{exp}) = \overline{S} + B_{id} * \alpha_{id} + B_{exp} * \alpha_{exp}$$

$$T(\beta_{tex}) = \overline{T} + B_{tex} * \beta_{tex}$$

Through the above formula, by substituting the shared identity coefficient, the shared texture coefficient, and the first target expression coefficient that have been trained, the accurate label geometry information and the accurate label texture information can be calculated, and based on the label geometry information and the label texture information, the fourth preset network model and the fifth preset network model are iteratively optimized to obtain the fourth target preset network model and the fifth target preset network model that have been trained. Specifically, the following training method can be referred:

Step 1, generating a second target loss function. In one embodiment, the generating of the second target loss function includes:

(1) Inputting the first target image feature into the fourth preset network model and the fifth preset network model separately, and correspondingly outputting the first predicted identity coefficient and the first predicted texture coefficient;

(2) Establishing a third difference based on a difference between the first predicted identity coefficient and a label identity coefficient and a difference between the first predicted texture coefficient and a label texture coefficient;

(3) Determining predicted geometry information and predicted texture information of a second predicted face three-dimensional model based on the first predicted identity coefficient, the first predicted texture coefficient, the first target expression coefficient, the first target posture coefficient and the first target lighting coefficient;

(4) Establishing a fourth difference based on a difference between the predicted geometry information and label geometry information and a difference between the predicted texture information and label texture information;

(5) Establishing the second target loss function based on the third difference and the fourth difference;

Step 2, performing a training based on the second target loss function. In one embodiment, a training process is as follows:

Performing an iterative optimization on second network parameters of the fourth preset network model and the fifth preset network model through the second target loss function until the second target loss function converges, and fourth target preset network model and the fifth target preset network model that have been trained are obtained.

Among them, the first target image feature can be input into the fourth preset network model and the fifth preset network model separately, and output the first predicted identity coefficient and the first predicted texture coefficient. Since the fourth preset network model and the fifth preset network model have not finished training yet, therefore, the first predicted identity coefficient and the first predicted texture coefficient are not optimal values.

The shared identity coefficient that has been trained can be used as the label identity coefficient and the shared texture coefficient that has been trained can be used as the label texture coefficient. However, in order to further improve a prediction accuracy of the fourth preset network model and the fifth preset network model, the embodiment of the present application can generate the second predicted face 3D model (including face 3D geometry and face texture) according to the first predicted identity coefficient, the first predicted texture coefficient, the first target expression coefficient, the first target posture coefficient, and the first target lighting coefficient.

Further, the third difference can be established based on the difference between the first predicted identity coefficient and the label identity coefficient and the difference between the first predicted texture coefficient and the label texture coefficient. The greater the third difference is, the less closer the first predicted identity coefficient is to the real label identity coefficient and the less closer the first predicted texture coefficient is to the real label texture coefficient, correspondingly, it indicates that the first predicted identity coefficient and the first predicted texture coefficient are less accurate, on the contrary, the smaller the third difference is, it indicates that the first predicted identity coefficient is closer to the real label identity coefficient and the first predicted texture coefficient is closer to the real label texture coefficient, correspondingly, it indicates that the first predicted identity coefficient and the first predicted texture coefficient are more accurate. The third difference can be calculated by the following formula:

$$L_{params} = \beta_d \|\hat{d} - d_{gt}\| + \beta_t \|\hat{t} - t_{gt}\|$$

Among them, $L_{params}$ represents the third difference, $\beta_d$ and $\beta_t$ represent preset weight coefficients, $\hat{d}$ represents the first predicted identity coefficient, $d_{gt}$ represents the label identity coefficient, $\hat{t}$ represents the first predicted texture coefficient, $t_{gt}$ represents the label texture coefficient, and the third difference can be calculated by the above formula.

The predicted geometry information and the predicted texture information of the second predicted face three-dimensional model can also be determined. The predicted geometry information and the predicted texture information are not optimal values, so it is necessary to establish the fourth difference based on the difference between the predicted geometry information and the real label geometry information and the difference between the predicted texture information and the real label texture information. The greater the fourth difference is, it indicates that the less closer the predicted geometry information is to the real label geometry information and the less closer the first predicted texture coefficient is to the real label texture coefficient, correspondingly, it is indicates that the first predicted identity coefficient and the first predicted texture coefficient are less accurate, on the contrary, the smaller the fourth difference is, it indicates that the closer the predicted geometry information is to the real label geometry information and the closer the first predicted texture coefficient is to the real label texture coefficient, correspondingly, it means that the first predicted identity coefficient and the first predicted texture coefficient are more accurate. The fourth difference can be calculated by the following formula:

$$L_{3d} = \beta_{geo} \|\hat{S} - S_{gt}\| + \beta_{tex} \|\hat{T} - T_{gt}\|$$

Among them, $L_{3d}$ represents the fourth difference, $\beta_{geo}$ and $\beta_{tex}$ represent preset weight coefficients, $S_{gt}$ represents the label geometry information, $\hat{S}$ represents the predicted geometry information, $T_{gt}$ represents the label texture information, and $\hat{T}$ represents the predicted texture information. The fourth difference is calculated using the above formula. And the second target loss function is established based on the third difference and the fourth difference.

Finally, the second network parameters of the fourth preset network model and the fifth preset network model are iteratively optimized according to the second target loss function until the second target loss function converges, and the fourth target preset network model and the fifth target preset network model that have been trained are obtained. That is, the fourth preset network model and the fifth preset network model can be optimized using the stochastic gradient descent algorithm according to the second target loss function, and repeated multiple times until the second target loss function converges, that is, the loss function converges, specifically, a total loss function of the third difference and the fourth difference can be established through the following formula, as follows:

$$L = \lambda_{params} L_{params} + \lambda_{3d} L_{3d}$$

Among them, L represents the second target loss function, $\lambda_{params}$ and $\lambda_{3d}$ represent preset weight coefficients. Based on the second target loss function, performing an optimization on the second network parameters of the fourth preset network model and the fifth preset network model according to the stochastic gradient descent algorithm, and repeatedly performing a generation of the second target loss function. The second network parameters of the fourth preset network model and the fifth preset network model are iteratively optimized through the second target loss function that is continuously updated, calculating the second target loss function for iteratively adjustment until the second target loss function in this part converges, and the fourth target preset network model and the fifth target preset network model that have been trained are obtained. Since the first network parameters of the first target preset backbone model, the first target preset network model, the second target preset network model, the third target preset network model, the shared identity coefficient, and the shared texture coefficient that have been trained already have trained, so the first network parameters are fixed during this training process. The fourth target preset network model that has been trained can output accurate identity coefficient based on the first image feature and the fifth target preset network model that has been trained can output accurate texture coefficient based on the first image feature.

Based on this, each first target image feature can be input into the fourth target preset network model and the fifth target preset network model that have been trained separately, and the accurate first target identity coefficient and the accurate first target texture coefficient can be output.

In this way, embodiments of the present application can obtain the first target preset network model, the second target preset network model, the third target preset network model, the fourth target preset network model, and the fifth target preset network model that are also applicable to other videos, and have good generalization and can be directly applied to other videos to quickly predict the expression coefficient, the posture coefficient, the lighting coefficient, the identity coefficient, and the texture coefficient of each frame, which greatly improves the efficiency of information processing.

In the above embodiment, since the training samples include video data of different objects, and all video data are trained together in one network model (for example, the network model may include the first target preset network model, the second target preset network model, the third target preset network model, the fourth target preset network model, and the fifth target preset network model), therefore, the network model trained through the training samples takes into account the difference between different objects. When related coefficients (for example, the expression coefficient, the posture coefficient, the lighting coefficient, the identity coefficient, the texture coefficient) need to be extracted from other video data in the further, the above network models that have been trained can be directly called. In one embodiment, the network models can also be trained separately based on video data of a single object.

The embodiment of the present application obtains the target video; inputs the face image of each frame into the first target preset backbone model, and outputs the first target image feature; separately inputs the first target image feature into the first target preset network model, the second target preset network model, and the third target preset network model, and correspondingly outputs the first target expression coefficient, the first target posture coefficient and the first target lighting coefficient; separately inputs the first target image feature into the fourth target preset network model and the fifth target preset network model, and correspondingly outputs the first target identity coefficient and the first target texture coefficient. In this way, by decoupling the expression coefficient and the non-expression coefficients, the accurate expression coefficient, the accurate posture coefficient, the accurate lighting coefficient, the accurate identity coefficient and the accurate texture coefficient can be quickly output. Compared with the solution of directly extracting the expression coefficient through the 3DMM method, the embodiments of the present application greatly improve the accuracy and efficiency of information processing.

In this embodiment, the information processing device is specifically integrated in a server as an example for description. Please refer to the following description for details.

Please refer to FIG. 6, FIG. 6 is a schematic diagram of another flowchart of an information processing method provided by an embodiment of the present application. The process of the method may include:

In step 601, the server obtains an initial video, extracts a face image of each frame in the initial video, and determines a video segment with a plurality of frames in which a same object appears continuously as an initial video segment.

In step 602, the server determines the initial video segment with a frame number greater than the preset threshold as a first target video segment, performs a style transformation on the first target video segment to obtain a second target video segment, and determines the first target video segment and the second target video segment as target videos.

In step 603, the server obtains the shared identity coefficient set and the shared texture coefficient set, matches the shared identity coefficient set and the shared texture coefficient set according to the face image of the same object in the target video, and obtains the corresponding shared identity coefficient and the corresponding shared texture coefficient.

In step 604, the server inputs the face image of each frame into the first preset backbone model, and outputs the first image feature, separately inputs the first image feature into the first preset network model, the second preset network model, and the third preset network model, and correspondingly outputs the first predicted expression coefficient, the first predicted posture coefficient, and the first predicted lighting coefficient.

In step 605, the server generates a first predicted face three-dimensional model based on the shared identity coefficient, the shared texture coefficient, the first predicted expression coefficient, the first predicted posture coefficient, and the first predicted lighting coefficient.

In step 606, the server obtains a first difference between the first face estimated value corresponding to the first predicted face three-dimensional model and the un-occluded area in the face image, obtains a second difference between the first predicted face three-dimensional key points corresponding to the first predicted face three-dimensional model and the face three-dimensional key points, establishes a constraint relationship between the shared identity coefficient, the shared texture coefficient, and the first predicted expression coefficient through a regularization loss function, generates a corresponding first target loss function according to the first difference, the second difference, and the constraint relationship, and optimizes first network parameters of the first preset backbone model, the first preset network model, the second preset network model, the third preset network model, the shared identity coefficient, and the shared texture coefficient according to the first target loss function.

In step 607, the server returns to input the face image of each frame into the first preset backbone model, and outputs the first image feature to iteratively optimize the first network parameters until the first target loss function converges, and obtains the first target preset backbone model, the first target preset network model, the second target preset network model, the third target preset network model, the shared identity coefficient, and the shared texture coefficient that have been trained.

In step 608, the server inputs the face image of each frame into the first target preset backbone model, and outputs the first target image feature, separately inputs the first target image feature into the first target preset network model, the second target preset network model, the third target preset network model, and correspondingly outputs the first target expression coefficient, the first target posture coefficient, and the first target lighting coefficient.

For descriptions of steps 601-608, please refer to the relevant descriptions of steps 301-308, which will not be described again here.

In step 609, the server separately inputs the first target image feature into the fourth preset network model and the fifth preset network model, and correspondingly outputs the first predicted identity coefficient and the first predicted texture coefficient, establishes a third difference based on a difference between the first predicted identity coefficient and a label identity coefficient and a difference between the first predicted texture coefficient and a label texture coefficient, determine predicted geometry information and predicted texture information of the second predicted face three-dimensional model based on the first predicted identity coefficient, the first predicted texture coefficient, the first target expression coefficient, the first target posture coefficient, and the first target lighting coefficient.

Figure 7:
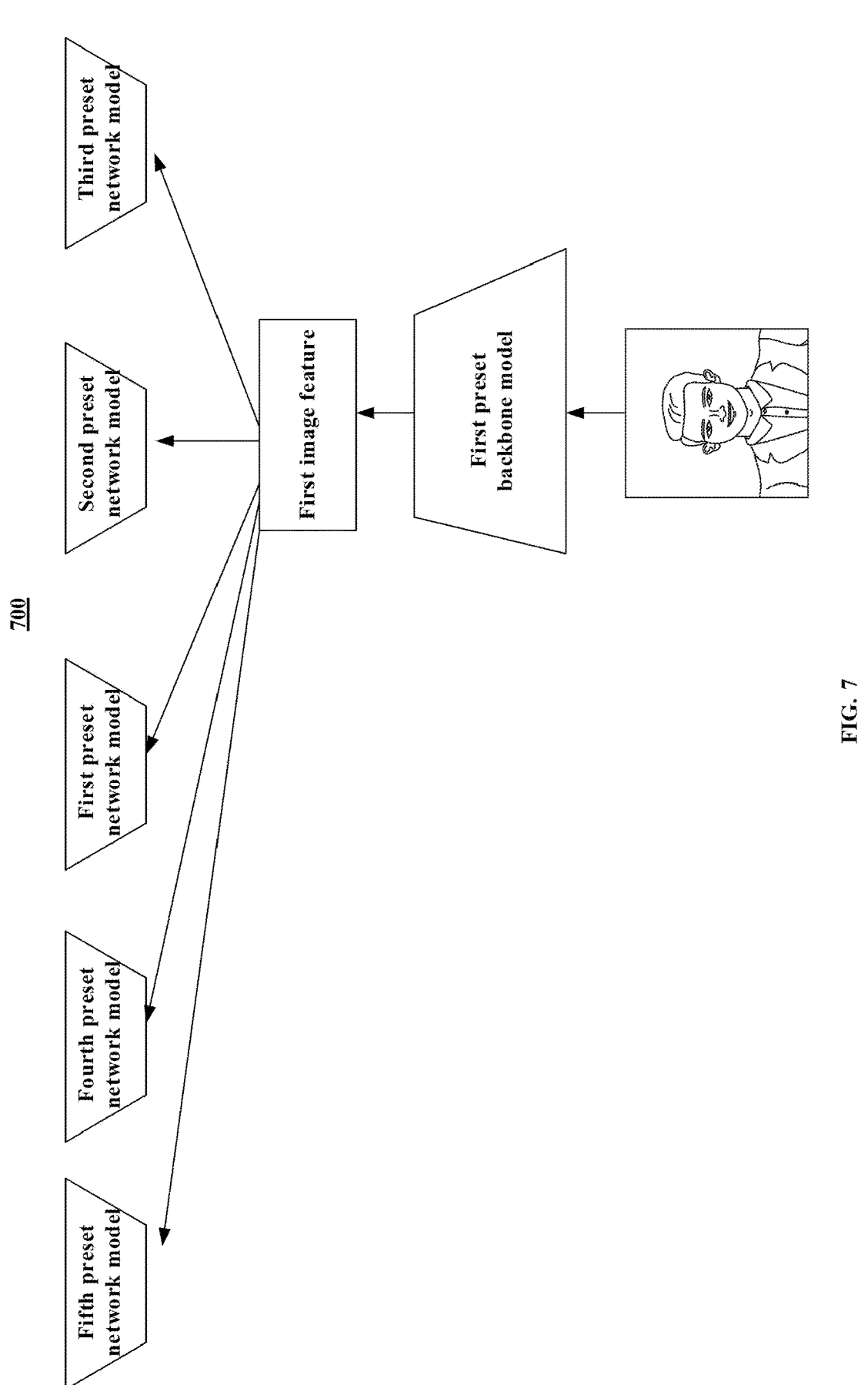
FIG. 7 is a schematic diagram of another framework of the information processing system provided by the embodi-ment of the present application.

Please refer to FIG. 7, FIG. 7 is a schematic diagram of another framework 700 of the information processing system provided by an embodiment of the present application. The fourth preset network model is used to predict the identity coefficient. The fifth preset network model is used to predict the texture coefficients. The fourth preset network model and the fifth preset network model can have similar structures, that is, they can adopt 4-layer ResBlock structure and a fully connected layer structure at the end. The fourth preset network model and the fifth preset network model can adopt different network structures, and the examples here are not specific limitations. Based on this, the server can separately input the first target image feature into the fourth preset network model and the fifth preset network model, and output the first predicted identity coefficient and the first predicted texture coefficient that are predicted. Due to the fourth preset network model and the fifth preset network model have not been trained completely. Therefore, the first predicted identity coefficient and the first predicted texture coefficient are not optimal values, so the fourth preset network model and the fifth preset network model need to be trained.

The shared identity coefficient can be used as the label identity coefficient and the shared texture coefficient can be used as the label texture coefficient. However, in order to further train and improve the prediction accuracy of the fourth preset network model and the fifth preset network model, the embodiment of the present application can generate the second predicted face 3D model (including face 3D geometry and face texture) based on the first predicted identity coefficient, the first predicted texture coefficient, the first target expression coefficient, the first target posture coefficient, and the first target lighting coefficient.

Further, the third difference may be established based on the difference between the first predicted identity coefficient and the label identity coefficient and the difference between the first predicted texture coefficient and the label texture coefficient. The greater the third difference is, the less closer the first predicted identity coefficient is to the real label identity coefficient and the less closer the first predicted texture coefficient is to the real label texture coefficient. Correspondingly, it means that the first predicted identity coefficient and the first predicted texture coefficient are less accurate; on the contrary, the smaller the third difference is, it means that the first predicted identity coefficient is closer to the real label identity coefficient and the first predicted texture coefficient is closer to the real label texture coefficient. Correspondingly, it means that the first predicted identity coefficient and the first predicted texture coefficient are more accurate. The third difference can be calculated by the following formula:

$$L_{params} = \beta_d \| \hat{d} - d_{gt} \| + \beta_t \| \hat{t} - t_{gt} \|$$

Among them, $L_{params}$ represents the third difference, $\beta_d$ and $\beta_t$ represent preset weight coefficients, $\hat{d}$ represents the first predicted identity coefficient, $d_{gt}$ represents the label identity coefficient, $\hat{t}$ represents the first predicted texture coefficient, $t_{gt}$ represents the label texture coefficient, and the third difference is calculated by the above formula.

In step 610, the server establishes a fourth difference based on a difference between the predicted geometry information and the label geometry information and a difference between the predicted texture information and the label texture information, establishes a second target loss function based on the third difference and the fourth difference, optimizes the second network parameters of the fourth preset network model and the fifth preset network model according to the second target loss function, and returns to separately input the first target image feature into the fourth preset network model and the fifth preset network model, and correspondingly outputs the first predicted identity coefficient and the first predicted texture coefficient to iteratively optimize the second network parameters until the second target loss function converges, and obtains the fourth target preset network model and the fifth target preset network model that have been trained.

Among them, the predicted geometry information and the predicted texture information of the second predicted face three-dimensional model can also be determined. The predicted geometry information and the predicted texture information are not optimal values, so it is necessary to establish the fourth difference base on the difference between the predicted geometry information and the real label geometry information and the difference between the predicted texture information and the real label texture information. The label geometry information and the label texture information can be calculated based on the shared identity coefficient, the shared texture coefficient, and the first target expression coefficient. The specific calculation method refers to the aforementioned embodiment and will not be described in detail here.

The greater the fourth difference is, the less closer the predicted geometry information is to the real label geometry information and the less closer the predicted texture coefficient is to the real label texture coefficient. Correspondingly, it means that the first predicted identity coefficient and the first predicted texture coefficient are less accurate; on the contrary, the smaller the fourth difference is, it means that the closer the predicted geometry information is to the real label geometry information and the closer the predicted texture coefficient is to the real label texture coefficient. Correspondingly, it means that the first predicted identity coefficient and the first predicted texture coefficient are more accurate. The fourth difference can be calculated by the following formula:

$$L_{3d} = \beta_{geo} \| \hat{S} - S_{gt} \| + \beta_{tex} \| \hat{T} - T_{gt} \|$$

Among them, $L_{3d}$ represents the fourth difference, $\beta_{geo}$ and $\beta_{tex}$ represent preset weight coefficients, $S_{gt}$ represents the label geometry information, $\hat{S}$ represents the predicted geometry information, $T_{gt}$ represents the label texture information, and $\hat{T}$ represents the predicted texture information. The fourth difference is calculated using the above formula. And the second target loss function is established based on the third difference and the fourth difference.

Finally, the second network parameters of the fourth preset network model and the fifth preset network model are iteratively optimized according to the second target loss function until the second target loss function converges, and the fourth target preset network model and the fifth target preset network model that have been trained are obtained. That is, the fourth preset network model and the fifth preset network model can be optimized using the stochastic gradient descent algorithm according to the second target loss function, and repeated multiple times until the second target loss function converges, that is, the loss function converges, specifically, a total loss function of the third difference and the fourth difference can be established through the following formula, as follows:

$$L = \lambda_{params}L_{params} + \lambda_{3d}L_{3d}$$

Among them, L represents the second target loss function, $\lambda_{params}$ and $\lambda_{3d}$ represent preset weight coefficients. Based on the second target loss function, the network parameters of the fourth preset network model and the fifth preset network model can be optimized according to the stochastic gradient descent algorithm, repeatedly inputs different first target image features into the fourth preset network model and the fifth preset network model in batches, and the second target loss function is calculated for iterative adjustment until the second target loss function converges, and the fourth target preset network model and the fifth target preset network model that have been trained are obtained. Since the first network parameters of the trained first preset network model, the trained second preset network model, and the trained third preset network model have been trained, the first network parameters are fixed during this training process. The trained fourth target preset network model and the trained fifth target preset network model can output accurate identity coefficient and accurate texture coefficient based on the first target image feature.

Based on this, each first target image feature can be separately input into the trained fourth target preset network model and the trained fifth target preset network model, and the accurate first target identity coefficient and the accurate first target texture coefficient can be output.

In step 611, the server separately inputs the first target image feature into the fourth target preset network model and the fifth target preset network model, and correspondingly outputs the first target identity coefficient and the first target texture coefficient.

Among them, the server can delete the shared identity coefficient and the shared texture coefficient, separately input the first target image feature into the trained fourth target preset network model and the trained fifth preset network model, and output the accurate first target identity coefficient and the accurate first target texture coefficient.

The embodiment of the present application obtains the target video; inputs the face image of each frame into the first target preset backbone model, and outputs the first target image feature; separately inputs the first target image feature into the first target preset network model, the second target preset network model, and the third target preset network model, and correspondingly outputs the first target expression coefficient, the first target posture coefficient and the first target lighting coefficient; separately inputs the first target image feature into the fourth target preset network model and the fifth target preset network model, and correspondingly outputs the first target identity coefficient and the first target texture coefficient. In this way, by decoupling the expression coefficient and the non-expression coefficients, the accurate expression coefficient, the accurate posture coefficient, the accurate lighting coefficient, the accurate identity coefficient and the accurate texture coefficient can be quickly output. Compared with the solution of directly extracting the expression coefficient through the 3DMM method, the embodiments of the present application greatly improve the accuracy and efficiency of information processing.

Please refer to FIG. 8, FIG. 8 is a schematic diagram of a flowchart of the information processing method provided by an embodiment of the present application. This information processing method includes:

In step 801, obtaining the target video.

In step 802, inputting the face image of each frame into the first target preset backbone model and outputting the first target image feature.

In step 803, separately inputting the first target image feature into the first target preset network model, the second target preset network model, and the third target preset network model, and correspondingly outputting the first target expression coefficient, the first target posture coefficient, and the first target lighting coefficient.

For descriptions of steps 801-803, please refer to the relevant descriptions of steps 501-503, which will not be described again here.

In step 804, separately inputting the first target image feature input into the fourth target preset network model and the fifth target preset network model, and correspondingly outputting the first target identity coefficient and the first target texture coefficient.

For the description of step 804, please refer to the relevant description of step 504, which will not be described again here.

In step 805, obtaining the second target identity coefficient and the second target texture coefficient of the face image corresponding to the first target image feature in each of other frames of the target video.

Among them, since the target video in the embodiment of the present application includes face images of the same subject in a short time, the identity coefficients and the texture coefficients of face images of different frames are very close, based on this principle, under a same target video, the second target identity coefficient and the second target texture coefficient of the face image corresponding to the first target image feature in each of other frames of the target video can be obtained as the prior identity coefficient and the prior texture coefficient. The second target identity coefficient and the second target texture coefficient can be obtained by simply inputting the image feature of the face image of each of other frames of the target video into the fourth target preset network model and the fifth target preset network model that have been trained.

In step 806, inputting the second target identity coefficient into the second target preset backbone model and outputting the first target identity feature.

Among them, the second target preset backbone model is used to extract a common feature of the second target identity coefficient. The second target preset backbone model can use a multi-layer perceptron network structure as a backbone network, such that the second target identity coefficient can be input into the second target preset backbone model and the corresponding first target identity feature can be output. A scale of the first target identity feature is consistent with a scale of the first image feature. For example, the second target identity coefficient can be 1*80 dimensions, and an output of the second target preset backbone model can be 1*40 dimensions, which can be copied and augmented according to a scale of the first image feature to obtain the first target identity feature, which can be 28*28*40. It can be understood that a consistent scale means that scales of a length and a width are same, and scales of channels are not required to be consistent.

It should be noted that the network parameters of the second target preset backbone model may be determined in advance. It can also be obtained through training. Please refer to the subsequent steps for the specific training process.

In step 807, inputting the second target texture coefficient into the third target preset backbone model and outputting the first target texture feature.

Among them, the third target preset backbone model is used to extract a common feature of the second target texture coefficient. The third target preset backbone model can adopt a multi-layer perceptron network structure as a backbone network.

In this way, the second target texture coefficient can be input into the third target preset backbone model, and the corresponding first target texture feature can be output. A scale of the first target texture feature is consistent with the scale of the first image feature. For example, the second target texture coefficient can be 1*80 dimensions, and an output of the third target preset backbone model can be 1*40 dimensions, which is copied and augmented according to the scale of the first image feature to obtain the first target texture feature. The scale of the first target texture feature can be 28*28*40.

It should be noted that network parameters of the second target preset backbone model can be determined in advance. It can also be obtained through training. Please refer to the subsequent steps for the specific training process.

In step 808, splicing the first target image feature, the first target identity feature, and the first target texture feature, and obtaining the first target feature.

Among them, the first target image feature, the first target identity feature, and the first texture feature can be spliced according to data dimension channel to obtain the first target feature. In this way, the first target feature can carry relevant information of a second target identity coefficient and a second target texture coefficient corresponding to the prior identity coefficient and the prior texture coefficient.

In step 809, inputting the first target feature into the target preset head network model and outputting the second target expression coefficient.

Among them, combined with the prior identity coefficients and the prior texture coefficients corresponding to the face images in the different frame in the target video, a prediction optimization training is performed to obtain the target preset head network model that has been trained. A preset head network model before the target preset head network model is trained can adopt a 4-layer ResBlock structure and a fully connected layer structure at the end to predict the second predicted expression coefficient. Since the preset head network model has not been trained completely, therefore, the second predicted expression coefficient that is predicted is not the optimal value.

Although the first preset network model and the preset head network model have the same network structure and both output expression coefficients, the first preset network model outputs the expression coefficient based on the face image that is singly input, and the preset head network model outputs the expression coefficient based on the face image, the prior identity coefficient, and the prior texture coefficient that are input.

In other words, the preset head network model can receive other prior information in addition to the face image. In video scenes, the preset head network model can make use of the prior information provided by past video frames, making it more suitable for use in video scenes and further improving a prediction accuracy of the expression coefficient.

In some embodiments, a process of prediction optimization training on the preset head network model is as follows:

Step 1, generating a third target loss function. In one embodiment, the generating of the third target loss function includes:

(1) Outputting a first identity feature by inputting the second target identity coefficient into the second preset backbone model;

(2) Outputting a first texture feature by inputting the second target texture coefficient into the third preset backbone model;

(3) Obtaining a first feature by splicing the first target image feature, the first identity feature, and the first texture feature;

(4) Outputting the second predicted expression coefficient by inputting the first feature into the preset head network model;

(5) Generating a third predicted face three-dimensional model based on the first target identity coefficient, the first target texture coefficient, the second predicted expression coefficient, the first target posture coefficient, and the first target lighting coefficient;

(6) Obtaining a fifth difference between a second face estimated value corresponding to the third predicted face three-dimensional model and an un-occluded area in the face image;

(7) Obtaining a sixth difference between second predicted face three-dimensional key points corresponding to the third predicted face three-dimensional model and face three-dimensional key points in the face image;

(8) Establishing the third target loss function based on the fifth difference and the sixth difference;

Step 2, performing a training based on the third target loss function. In one embodiment, a processing of the training is as follows:

Performing an iterative optimization on the third network parameters of the second preset backbone model, the third preset backbone model, and the preset head network model according to the third target loss function, until the third target loss function converges, and the second target preset backbone model, the third target preset backbone model, and the target preset head network model that have been trained are obtained.

Among them, the second preset backbone model is used to extract the common feature of the second target identity coefficient, the third preset backbone model extracts the common feature of the second texture identity coefficient, and the preset head network model is used to predict the expression coefficient, the second target identity coefficient can be input into the second preset backbone model to output the first identity feature; the second target texture coefficient can be input into the third preset backbone model to output the first texture feature.

The first target image feature, the first identity feature and the first texture feature are spliced to obtain the first feature. In this way, the first feature can carry the relevant information of the second identity coefficient and the second texture coefficient corresponding to the prior identity coefficient and the prior texture coefficient, but since the second preset backbone model and the third preset backbone model are both untrained network models, the first feature is not yet an optimal value.

The first feature can be input into the preset head network model and the second predicted expression coefficient that is predicted can be output.

In the related technology, since there is no "true value of coefficient" as a label for recursive training, it is impossible to directly measure whether the second predicted expression coefficient that is predicted is good or bad. In order to solve the above problem, embodiments of the present application can use a method of indirect measurement, that is, can obtain the first target identity coefficient, the first target texture coefficient, the second predicted expression coefficient, the first target posture coefficient and the first target lighting coefficient, and generate the third predicted face three-dimensional model (including face 3D geometry and face texture).

Further, the second face estimated value is a 2-dimensional image obtained by rendering a current estimated value (geometry, texture) of the constructed third predicted face three-dimensional model by a differentiable renderer.

A fifth difference between the second face estimated value corresponding to the third predicted face three-dimensional model and the un-occluded area in the face image (i.e., the original image) can be determined. The greater the fifth difference is, the less closer second face estimated value is to the face image, and correspondingly, it means that the less accurate the second predicted expression coefficient is, on the contrary, the smaller the fifth difference is, the closer the second face estimated value is to the face image, and correspondingly, it means that the more accurate the second predicted expression coefficient is.

When determining the fifth difference corresponding to the third predicted face three-dimensional model, the reason why the un-occluded area M is introduced is that the 3DMM model cannot express an occlusion, resulting in that all the "face image estimated values constructed by the coefficient estimated values" are complete faces. If the "face image true value" is not a complete face, such as wearing sunglasses, the difference between the two should not be compared at an occluded part, so we choose to use M to remove the occluded part and only compare the un-occluded part of the face. Therefore, during training, some common occlusions can be attached to the face image online based on the 3D key points of the face image. For example, the image of sunglasses is scaled and pasted to the human eyes according to the scale of the key points of the human eyes, resulting in augmentations at image levels such as partial occlusion of the face image, and enhancing the robustness of the deep neural network to face occlusion.

The second difference between the second predicted face three-dimensional key points corresponding to the third predicted face three-dimensional model and the face three-dimensional key points of the real face image can also be obtained. Specifically, vertices of semantic positions of the face 3D key points used by the third predicted face three-dimensional model can be projected onto an image to obtain the current estimated value of the face 3D key points (the third predicted face 3D key points), and calculate the sixth difference between the current estimated value and the true value of the face three-dimensional key points of the real face image in the un-occluded area M. The greater the sixth difference is, the less closer the third predicted face three-dimensional key points are to the real face three-dimensional key points, and correspondingly, the less accurate the second predicted expression coefficient is; on the contrary, the smaller the sixth difference is, the closer the predicted third predicted face three-dimensional key points are to the real face three-dimensional key points, and correspondingly, the more accurate the second predicted expression coefficient is, and the third target loss function is established according to the fifth difference and the sixth difference.

Finally, performing an iterative optimization on the third network parameters of the second preset backbone model, the third preset backbone model, and the preset head network model according to the third target loss function, until the third target loss function converges, and obtaining the second target preset backbone model, the third target preset backbone model and the target preset head network model that have trained. That is, the second preset backbone model, the third preset backbone model and the preset head network model can be optimized using the stochastic gradient descent algorithm according to the third target loss function, and repeatedly performing a generation of the third target loss function for multiple times, the third network parameters of the second preset backbone model, the third preset backbone model and the preset head network model are iteratively optimized through the third target loss function that is continuously updated, until the third target loss function converges, that is, the loss function converges, and the preset head network model that has been trained is obtained.

Based on this, the first target feature corresponding to the first target image feature can be input into the target preset head network model that has been trained to output an accurate second target expression coefficient. Due to an introduction of an additional constraint of the prior identity coefficient and the prior texture coefficient, and make use of prior information provided by past video frames, it is more suitable for use in video scenes. The first target feature corresponding to the first target image feature extracted from the first target image of each frame of the target video can be input into the target preset head network model, and the second target expression coefficient corresponding to each frame of the video is output. Using the second target expression coefficient that is output can further improve the accuracy.

As can be seen from the above, the embodiment of the present application obtains the target video; extracts the face image of each frame to obtain the first target image feature; separately inputs the first target image feature into the first target preset network model, the second target preset network model, and the third target preset network model, and outputs the first target expression coefficient, the first target posture coefficient and the first target lighting coefficient; separately input the first target image feature into the fourth target preset network model and the fifth target preset network model, and outputs the first target identity coefficient and the first target texture coefficient; outputs the first target identity feature and the first target texture feature obtained based on prior knowledge and obtains the first target feature by splicing the first target identity feature, the first target texture feature and the first target image feature; inputs the first target feature into the target preset head network model and outputs the second target expression coefficient, which greatly improves the accuracy of the extracted expression coefficient. Compared with the solution of directly extracting the expression coefficient through the 3DMM method, the embodiments of the present application greatly improve the accuracy of the extracted expression coefficient.

In conjunction with the methods described in the above embodiments, examples will be given below for further detailed description.

In this embodiment, the information processing device is specifically integrated in the server as an example for description. Please refer to the following description for details.

Please refer to FIGS. 9A-9B, FIGS. 9A-9B is a schematic diagram of another flow chart of the information processing method provided by the embodiment of the present application. The process of the method may include:

In step 901, the server obtains the initial video, extracts the face image of each frame in the initial video, and determines the video segment with the plurality of frames in which the same object appears continuously as the initial video segment.

In step 902, the server determines the initial video segment with the frame number greater than the preset threshold as the first target video segment, performs the style transformation on the first target video segment to obtain the second target video segment, and determines the first target video segment and the second target video segment as target videos.

In step 903, the server inputs the face image of each frame into the first preset backbone model and outputs the first image feature.

In step 904, the server separately inputs the first image feature into the first preset network model, the second preset network model and the third preset network model, and correspondingly outputs the first predicted expression coefficient, the first predicted posture coefficient and the first predicted lighting coefficient, and obtains the shared identity coefficient and the shared texture coefficient corresponding to the face image of the same object in the target video.

In step 905, the server generates the first predicted face three-dimensional model based on the shared identity coefficient, the shared texture coefficient, the first predicted expression coefficient, the first predicted posture coefficient, and the first predicted lighting coefficient.

In step 906, the server obtains the first difference between the first face estimated value corresponding to the first predicted face three-dimensional model and the un-occluded area in the face image, and obtains the second difference between the first predicated face three-dimensional key points corresponding to the first predicted face three-dimensional model and the face three-dimensional key points, establishes the constraint relationship between the shared identity coefficient, the shared texture coefficient and the first predicted expression coefficient through the regularization loss function, generates a corresponding first target loss function according to the first difference, the second difference, and the constraint relationship, and optimizes the first network parameters of the first preset backbone model, the first preset network model, the second preset network model, the third preset network model, the shared identity coefficient, and the shared texture coefficients according to the first target loss function.

In step 907, the server returns to input the face image of each frame into the first preset backbone model, and outputs the first image feature to iteratively optimize the first network parameters until the first target loss function converges, and obtains the first target preset backbone model, the first target preset network model, the second target preset network model, the third target preset network model, the shared identity coefficient and the shared texture coefficient that have been trained.

In step 908, the server inputs the face image of each frame into the first target preset backbone model, and outputs the first target image feature, separately inputs the first target image feature into the first target preset network model, the second target preset network model, and the third target preset network model, and correspondingly outputs the first target expression coefficient, the first target posture coefficient, and the first target lighting coefficient.

For descriptions of steps 901-908, please refer to the relevant descriptions of steps 301-308, which will not be described again here.

In step 909, the server separately inputs the first target image feature into the fourth preset network model and the fifth preset network model, and correspondingly outputs the first predicted identity coefficient and the first predicted texture coefficient, establishes the third difference based on the difference between the first predicted identity coefficient and the label identity coefficient and the difference between the first predicted texture coefficient and the label texture coefficient, and determines the predicted geometry information and the predicted texture information of the second predicted face three-dimensional model based on the first predicted identity coefficient, the first predicted texture coefficient, the first target expression coefficient, the first target posture coefficient, and the first target lighting coefficient.

In step 910, the server establishes the fourth difference based on the difference between the predicted geometry information and the label geometry information and the difference between the predicted texture information and the label texture information, establishes the second target loss function based on the third difference and the fourth difference, optimizes the second network parameters of the fourth preset network model and the fifth preset network model according to the second target loss function, and returns to separately input the first target image feature into the fourth preset network model and the fifth preset network model, and correspondingly outputs the first predicted identity coefficient and the first predicted texture coefficient to iteratively optimize the second network parameters until the second target loss function converges, and obtains the fourth target preset network model and the fifth target preset network model that have been trained.

For descriptions of steps 909-910, please refer to the relevant descriptions of steps 609-610, which will not be described again here.

In step 911, the server separately inputs the first target image feature into the fourth target preset network model and the fifth target preset network model, and correspondingly outputs the first target identity coefficient and the first target texture coefficient, obtains the second target identity coefficient and the second target texture coefficient of the face image corresponding to the first target image feature in each of other frames of the target video, inputs the second target identity coefficient into the second preset backbone model, and outputs the first identity feature, inputs the second target texture coefficient into the third preset backbone model, and outputs the first texture feature, and splices the first target image feature, the first identity feature and the first texture feature to obtain the first feature.

Among them, the server can delete the shared identity coefficient and the shared texture coefficient, separately input the first target image feature into the fourth target preset network model and the fifth preset network model that have been trained, and output the accurate first target identity coefficient and the accurate first target texture coefficient.

Furthermore, since the target video in the embodiment of the present application includes face images of the same subject in a short time, the identity coefficients and the texture coefficients of different face images are very close, based on this principle, under a same target video, the second target identity coefficient and the second target texture coefficient of the face image corresponding to the first target image feature in each of other frames of the target video can be obtained as the prior identity coefficient and the prior texture coefficient. The second target identity coefficient and the second target texture coefficient can be obtained by simply inputting the image feature of the face image of each of other frames of the target video into the fourth target preset network model and the fifth target preset network model that have been trained.

Figure 10:
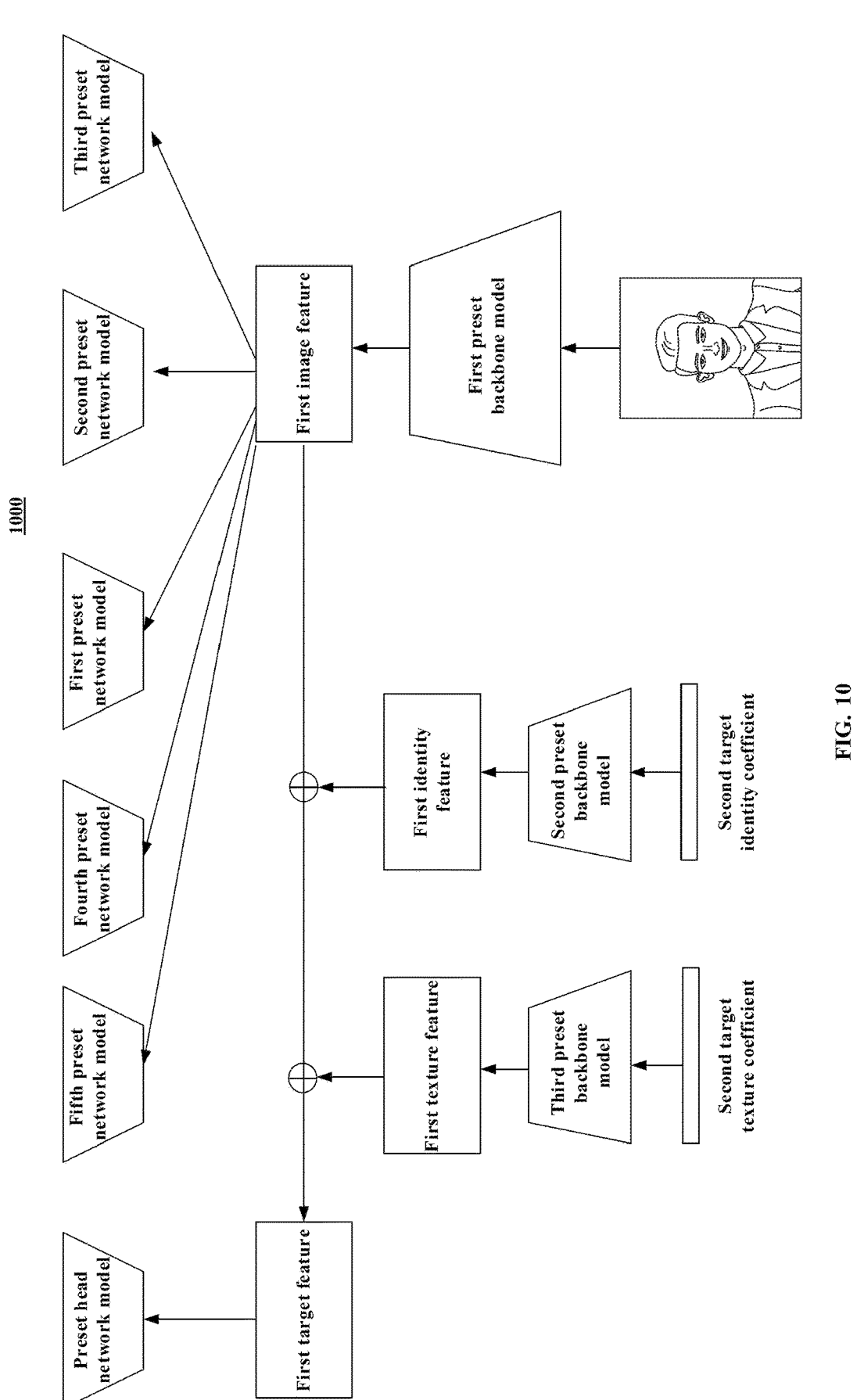
FIG. 10 is a schematic diagram of another framework of the information processing system provided by the embodi-ment of the present application.

Please also refer to FIG. 10, FIG. 10 is a schematic diagram of another framework 1000 of the information processing system provided by one embodiment of the present application. The second preset backbone model is used to extract the common feature of the second target identity coefficient. The second preset backbone model can use a network structure of a multi-layer perceptron as a backbone network. The third preset backbone model is used to extract the common feature of the second target texture coefficient. The third preset backbone model can use the network structure of the multi-layer perceptron as a backbone network, therefore, the second target identity coefficient can be input into the second preset backbone model and the corresponding first identity feature can be output. The second target texture coefficient can be input to the third preset backbone model and the corresponding first texture feature can be output. Scales of the first identity feature and the first texture feature are consistent with a scale of the first target image feature. For example, the first target identity coefficient can be 1*80 dimensions, and an output of the second preset backbone model can be 1*40 dimensions, copy and expand it according to the scale of the first image feature to obtain the first identity feature, which can be 28*28*40; the first target texture coefficient can be 1*80 dimensions, and the output of the third preset backbone model can be 1*40 dimensions, copy and expand it according to the scale of the first image feature to obtain the first texture feature, the scale of the first texture feature can be 28*28*40. It can be understood that a consistent scale means that scales of a length and a width are same, and scales of channels are not required to be consistent.

Since the first target image feature, the first identity feature, and the first texture feature have the same scale, the first target image feature, the first identity feature and the first texture feature can be spliced according to the data dimension channel to obtain the first target feature that is spliced, therefore, the first target feature can carry relevant information of the first identity feature and the first texture feature corresponding to the prior identity coefficient and the prior texture coefficient.

In step 912, the server outputs the second predicted expression coefficient by inputting the first feature into the preset head network model, generates the third predicted face three-dimensional model according to the first target identity coefficient, the first target texture coefficient, the second predicted expression coefficient, the first target posture coefficient and the first target lighting coefficient, obtains the fifth difference between the second face estimated value corresponding to the third predicted face three-dimensional model and the un-occluded area in the face image, obtains the sixth difference between the second predicted face three-dimensional key points corresponding to the third predicted face three-dimensional model and the face three-dimensional key points, and establishes the third target loss function based on the fifth difference and the sixth difference.

Among them, please continue to refer to FIG. 10, the target preset head network model that has been trained is obtained by performing the prediction optimization training combining the prior identity coefficient and the prior texture coefficient corresponding to the face image of the different frame in the target video. The preset head network model before the target preset head network model is trained can adopt the 4-layer ResBlock structure and the fully connected layer structure at the end. Based on this, each first feature can be input into the preset head network separately, and the second predicted expression coefficient that is predicted is output. Since the training of the preset head network model has not been completed, the second predicted expression coefficient is not yet an optimal value.

Although the first preset network model and the preset head network model have the same network structure and both output expression coefficients, the first preset network model outputs the expression coefficient based the face image that is singly input, and the preset head network model outputs the expression coefficient based on the face image, the prior identity coefficient and the prior texture coefficient that are input.

In other words, the preset head network model can receive other prior information in addition to the face image. In video scenarios, the preset head network model can make use of the prior information provided by past video frames, making it more suitable for use in video scenarios and further improving the prediction accuracy of the expression coefficient.

The preset head network model is used to predict the expression coefficient, the first feature corresponding to the first target image feature can be input into the preset head network model respectively, and the second predicted expression coefficient that is predicted can be output.

In the related technology, since there is no "true value of coefficient" as the label for recursive training, it is impossible to directly measure whether the second predicted expression coefficient that is predicted is good or bad, in order to solve the above problem, embodiments of the present application can use the method of indirect measurement, i.e., obtaining the first target identity coefficient, the first target texture coefficient, the second predicted expression coefficient, the first target posture coefficient and the first target lighting coefficient, and generating the third predicted face 3D model (including face 3D geometry and face texture).

The second face estimated value is a 2-dimensional image obtained by rendering the current estimated value (geometry, texture) of the constructed first predicted face three-dimensional model by the differentiable renderer.

A fifth difference between the second face estimated value corresponding to the third predicted face three-dimensional model and the un-occluded area in the face image (i.e., the original image) can be determined. The greater the fifth difference is, the less closer the second face estimated value is to the face image, and correspondingly, it means that the less accurate the second predicted expression coefficient is, on the contrary, the smaller the fifth difference is, the closer the second face estimated value is to the face image, and correspondingly, it means that the more accurate the second predicted expression coefficient is.

When determining the fifth difference corresponding to the third predicted face three-dimensional model, the reason why the un-occluded area M is introduced is that the 3DMM model cannot express the occlusion, resulting in that all the "face image estimated values constructed by the coefficient estimated values" are complete faces. If the "face image true value" is not the complete face, such as wearing sunglasses, the difference between the two should not be compared at the occluded part, so we choose to use M to remove the occluded part and only compare the un-occluded part of the face. Therefore, during training, some common occlusions can be attached to the face image online based on the 3D key points of the face image. For example, the image of sunglasses is scaled and pasted to the human eyes according to the scale of the key points of the human eyes, resulting in augmentations at image levels such as partial occlusion of the face image, and enhancing the robustness of the deep neural network to face occlusion.

The second difference between the second predicted face three-dimensional key points corresponding to the third predicted face three-dimensional model and the face three-dimensional key points of the real face image can also be obtained. Specifically, vertices of semantic positions of the face 3D key points used by the third predicted face three-dimensional model can be projected onto an image to obtain the current estimated value of the face 3D key points (the third predicted face 3D key points), and calculate the sixth difference between the current estimated value and the true value of the face three-dimensional key points of the real face image in the un-occluded area M. The greater the sixth difference is, the less closer the predicted third predicted face three-dimensional key points are to the real face three-dimensional key points, and correspondingly, the less accurate the second predicted expression coefficient is, on the contrary, the smaller the sixth difference is, the closer the predicted third predicted face three-dimensional key points are to the real face three-dimensional key points, and correspondingly, the more accurate the second predicted expression coefficient is.

Finally, the third target loss function is established based on the fifth difference and the sixth difference.

In step 913, the server optimizes the third network parameters of the second preset backbone model, the third preset backbone model and the preset head network model according to the third target loss function, returns to input the second target identity coefficient into the second preset backbone model and outputs the first identity feature to iteratively optimize the third network parameters until the third target loss function converges, and obtains the second target preset backbone model, the third target preset backbone model, and the target preset head network model that have been trained.

Among them, please continue to refer to FIG. 10, the server can optimize the third network parameters of the second preset backbone model, the third preset backbone model and the preset head network model according to the third target loss function, and returns to the step of outputting the first identity feature by inputting the second target identity coefficient into the second preset backbone model, to iteratively optimize the third network parameters, so that the predictions of the second preset backbone model, the third preset backbone model and the preset head network model becomes more and more accurate, and the third target loss function becomes smaller and smaller until the third target loss function converges, and the second target preset backbone model, the third target preset backbone model and the target preset head network model that have been trained are obtained. That is, the second preset backbone model, the third preset backbone model, and the preset head network model can be optimized using the stochastic gradient descent algorithm according to the third target loss function, and repeated multiple times until the third target loss function converges, i.e., the loss function converges, and the target preset head network model that has been trained is obtained.

In step 914, the server outputs the first target identity feature by inputting the second target identity coefficient into the second target preset backbone model, outputs the first target texture feature by inputting the second target texture coefficient into the third target preset backbone model, obtains the first target feature by splicing the first target image feature, the first target identity feature, and the first target texture feature, and outputs the second target expression coefficient by inputting the first target feature into the target preset head network model.

Among them, the server can input the second target identity coefficient into the second target preset backbone model and output the accurate first target identity feature, input the second target texture coefficient into the third target preset backbone model and output the accurate first target texture feature, splice the first target image feature, the first target identity feature and the first target texture feature and obtain the first target feature.

Further, input the first target feature corresponding to the first target image feature into the target preset head network model that has been trained to output the accurate second target expression coefficient. Due to the introduction of additional constraint of the prior identity coefficient and the prior texture coefficient, use the prior information provided by past video frames, which is more suitable for use in video scenes, and can further improve the accuracy of output the second target expression coefficient.

As can be seen from the above, the embodiment of the present application obtains the target video; extracts the face image of each frame to obtain the first target image feature; and separately inputs the first target image feature into the first target preset network model and the second target preset network model, and the third target preset network model and outputs the first target expression coefficient, the first target posture coefficient, and the first target lighting coefficient; separately inputs the first target image feature into the fourth target preset network model and the fifth target preset network model, and outputs the first target identity coefficient and the first target texture coefficient; outputs the first target identity feature and the first target texture feature obtained based on prior knowledge, and obtains the first target feature by splicing the first target identity feature, the first target texture feature, and the first target image feature; inputs the first target feature into the target preset head network model and outputs the second target expression coefficient, which greatly improves the accuracy of the extracted expression coefficient. Compared with the solution of directly extracting the expression coefficient through the 3DMM method, the embodiments of the present application greatly improve the accuracy of the extracted expression coefficient.

Figures 11, 12, 13:
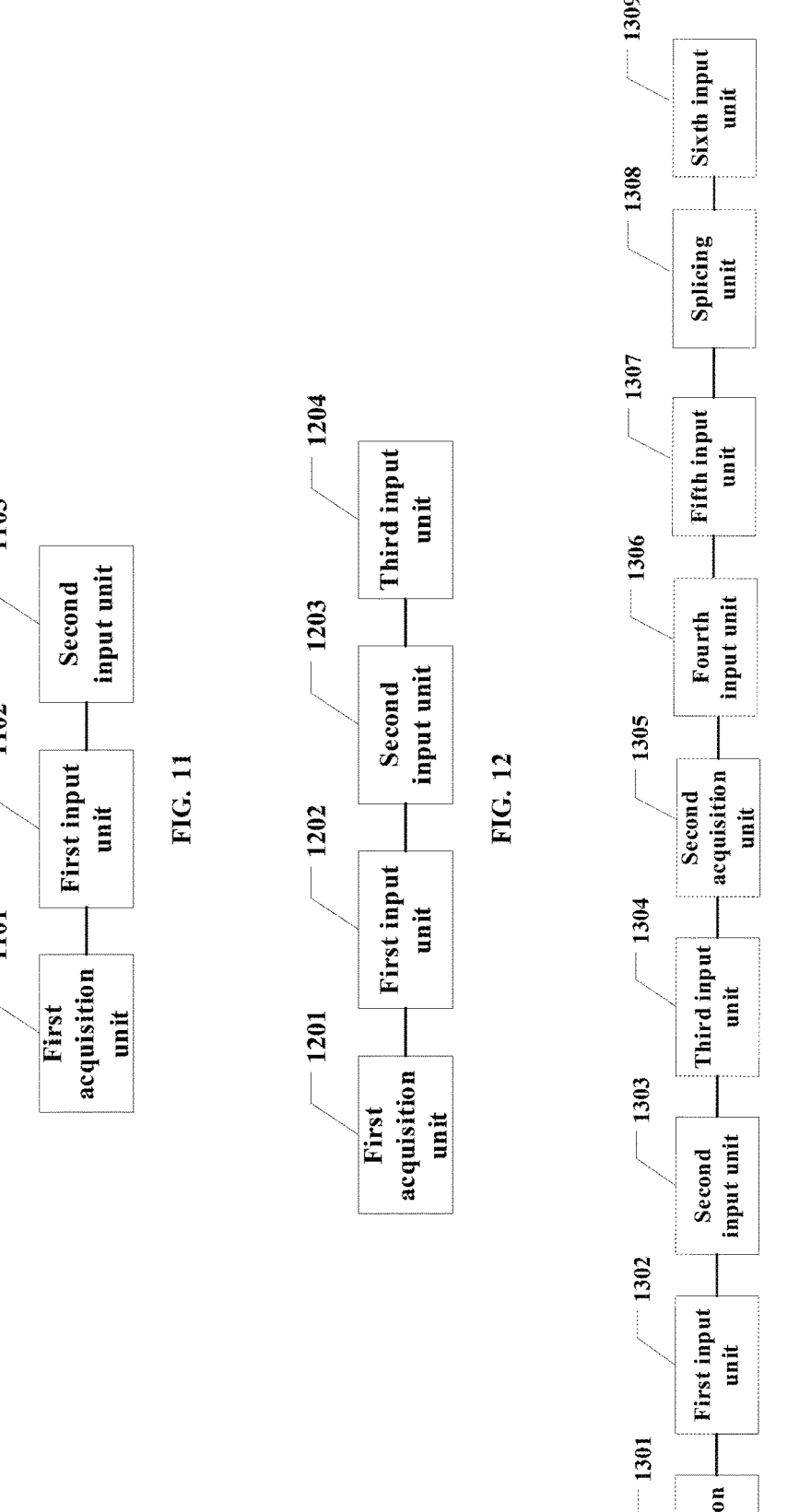
FIG. 11 is a schematic diagram of a structure of an information processing device provided by an embodiment of the present application.
FIG. 12 is a schematic diagram of another structure of the information processing device provided by an embodiment of the present application.
FIG. 13 is a schematic diagram of another structure of the information processing device provided by an embodiment of the present application.

Please refer to FIG. 11, FIG. 11 is a schematic diagram of a structural of an information processing device provided by an embodiment of the present application. The information processing device may include a first acquisition unit 1101, a first input unit 1102, and a second input unit 1103.

The first acquisition unit 1101 is used to obtains the target video, each frame of the target video includes the face image corresponding to the same object.

The first input unit 1102 is used to input the face image of each frame into the first target preset backbone model, and output the first target image feature.

The second input unit 1103 is used to input the first target image feature into the first target preset network model, and output the first target expression coefficient; among them, the first target preset network model is obtained by obtaining the shared identity coefficient and the shared texture coefficient, and correspondingly performing the prediction optimization training on the expression coefficient.

Please refer to FIG. 12, FIG. 12 is a schematic diagram of another structure of the information processing device provided by an embodiment of the present application. The information processing device may include a first acquisition unit 1201, a first input unit 1202, a second input unit 1203, and a third input unit 1204.

The first acquisition unit 1201 is used to acquire the target video, each frame of the target video includes the face image corresponding to the same object.

The first input unit 1202 is used to input the face image of each frame into the first target preset backbone model and output the first target image feature.

The second input unit 1203 is used to separately input the first target image feature into the first target preset network model, the second target preset network model and the third target preset network model, and correspondingly output the first target expression coefficient, the first target posture coefficient, and the first target lighting coefficient, among them, the first target preset network model, the second target preset network model, and the third target preset network model are obtained by obtaining the shared identity coefficient and the shared texture coefficient, and correspondingly performing the prediction optimization training on the expression coefficient, the posture coefficient, and the lighting coefficient.

The third input unit 1204 is used to separately input the first target image feature into the fourth target preset network model and the fifth target preset network model, and correspondingly output the first target identity coefficient and the first target texture coefficient; among them, the fourth target preset network model and the fifth target preset network model are obtained by performing the corresponding prediction optimization training on the identity coefficient and the texture coefficient after determining the first target expression coefficient, the first target posture coefficient, and the first target lighting coefficient.

Please refer to FIG. 13, FIG. 13 is a schematic diagram of another structure of the information processing device provided by an embodiment of the present application. The information processing device may include a first acquisition unit 1301, a first input unit 1302, a second input unit 1303, a third input unit 1304, a second acquisition unit 1305, a fourth input unit 1306, a fifth input unit 1307, a splicing unit 1308, and a sixth input unit 1309.

The first acquisition unit 1301 is used to obtain the target video, each frame of the target video includes the face image corresponding to the same object.

The first input unit 1302 is used to input the face image of each frame into the first target preset backbone model and output the first target image feature.

The second input unit 1303 is used to separately input the first target image feature into the first target preset network model, the second target preset network model, and the third target preset network model, and correspondingly output the first target expression coefficient, the first target posture coefficient, and the first target lighting coefficient; among them, the first target preset network model, the second target preset network model, and the third target preset network model are obtained by obtaining the shared identity coefficient and the shared texture coefficient, and performing the corresponding prediction optimization training on the expression coefficient, the posture coefficient, and the lighting coefficient.

The third input unit 1304 is used to input the first target image feature into the fourth target preset network model and the fifth target preset network model separately, and correspondingly output the first target identity coefficient and the first target texture coefficient; among them, the fourth target preset network model and the fifth target preset network model are obtained by performing the corresponding prediction optimization training on the identity coefficient and the texture coefficient after determining the first target expression coefficient, the first target posture coefficient and the first target lighting coefficient.

The second acquisition unit 1305 is used to acquire the second target identity coefficient and the second target texture coefficient of the face image corresponding to the first target image feature in each of other frames of the target video.

The fourth input unit 1306 is used to input the second target identity coefficient into the second target preset backbone model and output the first target identity feature.

The fifth input unit 1307 is used to input the second target texture coefficient into the third target preset backbone model and output the first target texture feature.

The splicing unit 1308 is used to splice the first target image feature, the first target identity feature and the first target texture feature to obtain the first target feature.

The sixth input unit 1309 is used to input the first target feature into the target preset head network model and output the second target expression coefficient, among them, the target preset head network model is obtained by performing the prediction optimization training combining the prior identity coefficient and the prior texture coefficient corresponding to the face image of the different frame in the target video.

In some embodiments, the first acquisition unit includes:

An acquisition subunit, is used to acquire an initial video;

An extraction subunit, is used to extract the face image of each frame in the initial video;

A first determination subunit, is used to determine a video segment with a plurality of frames in which a same object appears continuously as an initial video segment;

A second determination subunit, is used to determine an initial video segment with a number of frames greater than a preset threshold as a target video segment.

In some embodiments, the second determination subunit is specifically used to:

Determine the initial video segment with the number of frames greater than the preset threshold as a first target video segment;

Obtain a second target video segment by performing a style transformation on the first target video segment;

Determine the first target video segment and the second target video segment as target videos.

In some embodiments, the device further includes:

A third acquisition unit, is used to obtain the shared identity coefficient set and the shared texture coefficient set; among them, face images of different objects correspond to different shared identity coefficients and shared texture coefficients;

A matching unit, is used to match the shared identity coefficient set and the shared texture coefficient set according to the face image corresponding to the same object in the target video, and obtain the corresponding shared identity coefficient and shared texture coefficient;

A first training unit, is used to perform the prediction optimization training on the expression coefficient, the posture coefficient, and the lighting coefficient for the first preset network model, the second preset network model, and the third preset network model based on the shared identity coefficient and the shared texture coefficient, and obtain the first target preset network model, the second target preset network model and the third target preset network model.

In some embodiments, the first training unit includes:

A first generation subunit, is used to generate the first target loss function;

A first training subunit, is used to iteratively optimize the first network parameters of the first preset backbone model, the first preset network model, the second preset network model, the third preset network model, the shared identity coefficient, and the shared texture coefficient according to the first target loss function, until the first target loss function converges, and the first target preset backbone model, the first target preset network model, the second target preset network model, the third target preset network model, the shared identity coefficient, and the shared texture coefficient that have been trained are obtained;

The first generation subunit is specifically used to: input the face image of each frame into the first preset backbone model and output the first image feature;

Separately input the first image feature into the first preset network model, the second preset network model, and the third preset network model, and correspondingly output the first predicted expression coefficient, the first predicted posture coefficient, and the first predicted lighting coefficient;

Obtain the shared identity coefficient and the shared texture coefficient corresponding to the face image of the same object in the target video;

Generate the first predicted face three-dimensional model according to the shared identity coefficient, the shared texture coefficient, the first predicted expression coefficient, the first predicted posture coefficient, and the first predicted lighting coefficient;

Obtain the first difference between the first face estimated value corresponding to the first predicted face three-dimensional model and the un-occluded area in the face image;

Obtain the second difference between the first predicted face three-dimensional key points corresponding to the first predicted face three-dimensional model and the face three-dimensional key points;

Establish the constraint relationship between the shared identity coefficient, the shared texture coefficient, and the first predicted expression coefficient through the regularization loss function;

Generate the corresponding first target loss function according to the first difference, the second difference, and the constraint relationship.

In some embodiments, the first training subunit is specifically used to:

Optimize the first network parameters of the first preset backbone model, the first preset network model, the second preset network model, the third preset network model, the shared identity coefficient and the shared texture coefficient according to the first target loss function;

Return to repeatedly performing a generation of the first target loss function, and iteratively optimize the first network parameters of the first preset backbone model, the first preset network model, the second preset network model, the third preset network model, the shared identity coefficient, and the shared texture coefficient according to the first target loss function that is generated, until the first target loss function converges, and the first target preset backbone model, the first target preset network model, the second target preset network model, the third target preset network model, the shared identity coefficient, and the shared texture coefficient that have been trained are obtained.

In some embodiments, the device further includes:

A first determination unit, is used to determine the label geometry information and the label texture information based on the shared identity coefficient and the shared texture coefficient that have been trained;

A second training unit, is used to iteratively optimize the fourth preset network model and the fifth preset network model based on the label geometry information and the label texture information to obtain the fourth target preset network model and the fifth target preset network model that have been trained.

In some embodiments, the second training unit includes:

A second generation subunit, is used to generate the second target loss function;

A second training subunit, is used to iteratively optimize the second network parameters of the fourth preset network model and the fifth preset network model through the second target loss function until the second target loss function converges, and obtain the fourth target preset network model and the fifth target preset network model that have been trained;

The second generation subunit is specifically used to: input the first target image feature into the fourth preset network model and the fifth preset network model separately, and correspondingly output the first predicted identity coefficient and the first predicted texture coefficient;

establish the third difference based on the difference between the first predicted identity coefficient and the label identity coefficient and the difference between the first predicted texture coefficient and the label texture coefficient;

Determine the predicted geometry information and the predicted texture information of the second predicted face three-dimensional model according to the first predicted identity coefficient, the first predicted texture coefficient, the first target expression coefficient, the first target posture coefficient, and the first target lighting coefficient;

Establish the fourth difference based on the difference between the predicted geometry information and the label geometry information and the difference between the predicted texture information and the label texture information;

Establish the second target loss function based on the third difference and the fourth difference.

In some embodiments, the second training subunit is specifically used to:

Optimize the second network parameters of the fourth preset network model and the fifth preset network model according to the second target loss function;

Return to repeatedly performing a generation of the second target loss function, iteratively optimize the second network parameters of the fourth preset network model and the fifth preset network model by using the second target loss function that is generated, until the second target loss function converges, and obtain the fourth target preset network model and the fifth target preset network model that have been trained.

In some embodiments, the device further includes a third training unit, specifically including:

A third generation subunit, is used to generate the third target loss function;

A third training subunit, is used to iteratively optimize the third network parameters of the second preset backbone model, the third preset backbone model, and the preset head network model according to the third target loss function, until the third target loss function converges, and obtain the second target preset backbone model, the third target preset backbone model, and the target preset head network model that have been trained;

The third generation subunit is specifically configured to: input the second target identity coefficient into the second preset backbone model and output the first identity feature;

Input the second target texture coefficient into the third preset backbone model and output the first texture feature;

Splice the first target image feature, the first identity feature, and the first texture feature to obtain the first feature;

Input the first feature into the preset head network model and output the second predicted expression coefficient;

Generate the third predicted face three-dimensional model according to the first target identity coefficient, the first target texture coefficient, the second predicted expression coefficient, the first target posture coefficient, and the first target lighting coefficient;

Obtain the fifth difference between the second face estimated value corresponding to the third predicted face three-dimensional model and the un-occluded area in the face image;

Obtain the sixth difference between the second predicted three-dimensional key points corresponding to the third predicted face three-dimensional model and the face three-dimensional key points;

Establish the third target loss function based on the fifth difference and the sixth difference.

In some embodiments, the third training subunit is specifically used to:

Optimize the third network parameters of the second preset backbone model, the third preset backbone model, and the preset head network model according to the third target loss function;

Return to repeatedly performing a generation of the third target loss function, iteratively optimize the third network parameters of the second preset backbone model, the third preset backbone model, and the preset head network model by using the third target loss function that is generated, until the third target loss function converges, and obtain the second target preset backbone model, the third target preset backbone model, and the target preset head network model that have been trained.

The specific embodiment of each of the above units may be referred to the previous embodiments and will not be described again here.

Figure 14:
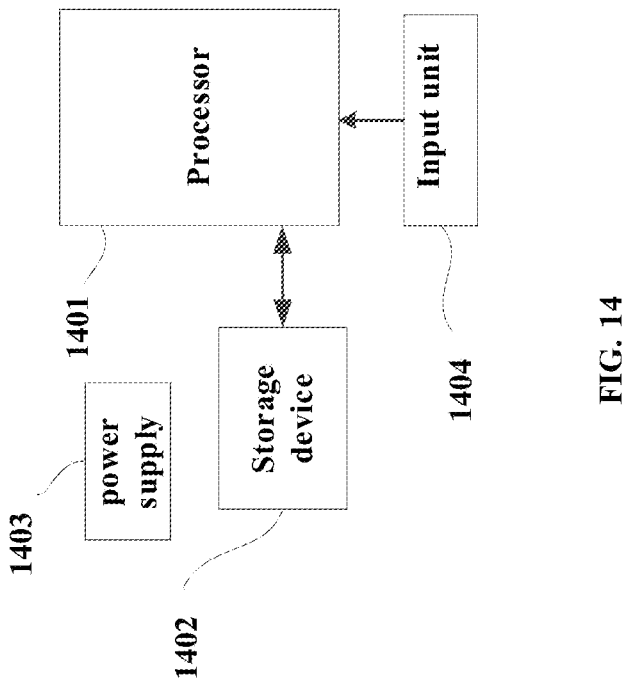
FIG. 14 is a schematic diagram of a structure of a server provided by an embodiment of the present application.

Embodiments of the present application also provides a computer device, as shown in FIG. 14, which shows a schematic diagram of a structure of a server involved in the embodiment of the present application, specifically:

The computer device may include components such as a processor 1401 including one or more processing cores, a storage device 1402 of one or more computer-readable storage medium, a power supply 1403, and an input unit 1404. Those skilled in the art can understand that the structure of the computer device shown in FIG. 14 does not constitute a limitation on the computer device, and may include more or fewer components than shown in the figure, or combine certain components, or arrange different components. Among them:

The processor 1401 is a control center of the computer device, using various interfaces and lines to connect various parts of the entire computer device, by running or executing software programs and/or modules stored in the storage device 1402, and calling data stored in the storage device 1402, perform various functions of the computer device and process the data to conduct overall monitoring of the computer device. Optionally, the processor 1401 may include one or more processing cores; optionally, the processor 1401 may integrate an application processor and a modem processor, among them, the application processor mainly processes the operating system, user interface and application programs, etc., the modem processor mainly processes wireless communications. It can be understood that the above modem processor may not be integrated into the processor 1401.

The storage device 1402 can be used to store software programs and modules, and the processor 1401 executes various functional applications and information processing by running the software programs and modules stored in the storage device 1402. The storage device 1402 may mainly include a storage program area and a storage data area, among them, the storage program area may store an operating system, an application program required for at least one function (such as a sound playback function, an image playback function, etc.), etc.; the storage data area may store data created according to the use of the computer device, etc. In addition, the storage device 1402 may include a high-speed random access memory, and may also include a non-volatile storage device, such as at least one magnetic disk storage device, flash memory device, or other volatile solid-state storage device. Accordingly, the storage device 1402 may also include a storage device controller to provide the processor 1401 with access to the storage device 1402.

The computer device also includes a power supply 1403 that supplies power to various components. Optionally, the power supply 1403 can be logically connected to the processor 1401 through a power management system, thereby realizing functions such as charging, discharging, and power consumption management through the power management system. The power supply 1403 may also include one or more direct current or alternating current power supplies, recharging systems, power failure detection circuits, power converters or inverters, power status indicators, and other arbitrary components.

The computer device may further include an input unit 1404 that may be used to receive numeric or character information that is input and generate signals of keyboard, mouse, joystick, optical, or trackball related to user settings and functional controls.

Although not shown, the computer device may further include a display unit and the like, which will not be described again here. Specifically, in this embodiment, the processor 1401 in the computer device can load executable files corresponding to processes of one or more application programs into the storage device 1402 according to following instructions, and the processor 1401 can run the application program stored in the storage device 1402, and implement various method steps provided by the foregoing embodiments.

In the above embodiments, each embodiment is described with its own emphasis. For those that are not described in detail in a certain embodiment, please refer to the detailed description of the information processing method above and will not be described again here.

The ordinary skilled in the art can understand that all or part of the steps in the various methods of the above embodiments can be completed by instructions, or by controlling relevant hardware through instructions. The instructions can be stored in a computer-readable storage medium, and loaded and executed by the processor.

In this respect, embodiments of the present application provide a computer-readable storage medium in which a plurality of instructions are stored, and the instructions can be loaded by the processor to execute the steps in any information processing method provided by the embodiments of the present application. For example, the instructions can perform the various method steps provided by the foregoing embodiments.

According to one aspect of the present application, a computer program product or a computer program is provided, the computer program product or computer program includes computer instructions stored in a computer-readable storage medium. The processor of the computer device reads the computer instructions from the computer-readable storage medium, and the processor executes the computer instructions, so that the computer device performs the methods provided in the various optional implementations provided by the above embodiments.

For the specific implementation of each of the above operations, please refer to the previous embodiments and will not be described again here.

The computer-readable storage medium may include: read only memory (ROM), random access memory (RAM), magnetic disk or optical disk, etc.

Since the instructions stored in the computer-readable storage medium can execute the steps in any information processing method provided by the embodiments of this application, therefore, any of the information processing method provided by the embodiments of this application can be implemented. The beneficial effects that can be achieved are detailed in the previous embodiments and will not be described again here.

The information processing method, the device, the computer device and the storage medium provided by the embodiments of the present application have been introduced in detail. This article uses specific examples to illustrate the principles and implementation methods of the present application. The description of the above embodiments is only used to help understand the methods and core ideas of this application; at the same time, for those skilled in the art, there will be changes in the specific implementation and the application scope based on the ideas of the present application. In summary, the contents of the specification should not be construed as limitations on this application.

What is claimed is:

1. An information processing method, comprising:
obtaining a target video comprising a plurality of frames, each frame of the plurality of frames comprising a face image of a same object; and
for each frame of the frames,
obtaining a first target image feature by inputting the face image comprised in the each frame into a first target preset backbone model comprising a neural network model; and obtaining a first target expression coefficient by inputting the first target image feature into a first target preset network model comprising a neural network model, wherein the first target preset network model is obtained by performing expression coefficient prediction optimization training on a first preset network model according to a shared identity coefficient and a shared texture coefficient for the same object involved in the plurality of frames,
wherein the obtaining of the target video comprises:
obtaining an initial video;
extracting the face image of each frame in the initial video;
determining the same object by analyzing the face image of each frame, and determining one or more video segments from the initial video, each of the one or more video segments includes at least two frames, and the same object appears in each of the at least two frames; and
determining one of the one or more video segments with a number of frames greater than a preset threshold as the target video.

2. The information processing method according to claim 1, further comprising: after obtaining the first target image feature,
obtaining a first target posture coefficient by inputting the first target image feature into a second target preset network model comprising a neural network model; and obtaining a first target lighting coefficient by inputting the first target image feature into a third target preset network model comprising a neural network model, wherein the second target preset network model is obtained by performing posture coefficient prediction optimization training on a second preset network model according to the shared identity coefficient and the shared texture coefficient, and the third target preset network model is obtained by performing lighting coefficient prediction optimization training on a third preset network model according to the shared identity coefficient and the shared texture coefficient; and
obtaining a first target identity coefficient by inputting the first target image feature into a fourth target preset network model comprising a neural network model; and obtaining a first target texture coefficient by inputting the first target image feature into a fifth target preset network model comprising a neural network model, wherein the fourth target preset network model is obtained by performing identity coefficient prediction optimization training on a fourth preset network model after determining the first target expression coefficient, the first target posture coefficient and the first target lighting coefficient, and the fifth target preset network model is obtained by performing texture coefficient prediction optimization training on a fifth preset network model after determining the first target expression coefficient, the first target posture coefficient and the first target lighting coefficient.

3. The information processing method according to claim 2, further comprising:
obtaining a second target identity coefficient and a second target texture coefficient of the face image comprised in another one of the frames different from the each frame;
obtaining a first target identity feature by inputting the second target identity coefficient into a second target preset backbone model comprising a neural network model;

obtaining a first target texture feature by inputting the second target texture coefficient into a third target preset backbone model comprising a neural network model;

splicing the first target image feature, the first target identity feature, and the first target texture feature together to obtain a first target feature; and obtaining a second target expression coefficient by inputting the first target feature into a target preset head network model comprising a neural network model, wherein the target preset head network model is obtained by performing prediction optimization training on a preset head network model with a prior identity coefficient and a prior texture coefficient of the face image contained in each one of the frames different from the each frame.

4. The information processing method according to claim 3, further comprising: after obtaining the second target identity coefficient and the second target texture coefficient of the face image another one of the frames different from the each frame, generating a third target loss function; and iteratively optimizing third network parameters of a second preset backbone model, a third preset backbone model, and a preset head network model according to the third target loss function, until the third target loss function converges, to obtain the second target preset backbone model, the third target preset backbone model and the target preset head network model that have been trained;

wherein, the generating of the third target loss function comprises:

inputting the second target identity coefficient into the second preset backbone model, to obtain a first identity feature;

inputting the second target texture coefficient into the third preset backbone model, to obtain the first texture feature;

splicing the first target image feature, the first identity feature, and the first texture feature together to obtain a first feature;

inputting the first feature into the preset head network model, to obtain a second predicted expression coefficient;

generating a third predicted face three-dimensional model according to the first target identity coefficient, the first target texture coefficient, the second predicted expression coefficient, the first target posture coefficient, and the first target lighting coefficient;

obtaining a fifth difference between a second face estimated value corresponding to the third predicted face three-dimensional model and an un-occluded area in the face image;

obtaining a sixth difference between second predicted face three-dimensional key points corresponding to the third predicted face three-dimensional model and face three-dimensional key points; and establishing the third target loss function based on the fifth difference and the sixth difference.

5. The information processing method according to claim 4, wherein iteratively optimizing the third network parameters of the second preset backbone model, the third preset backbone model, and the preset head network model according to the third target loss function, until the third target loss function converges, to obtain the second target preset backbone model, the third target preset backbone model and the target preset head network model that have been trained, comprises:

optimizing the third network parameters of the second preset backbone model, the third preset backbone model, and the preset head network model according to the third target loss function; and returning to repeatedly performing the generation of the third target loss function, iteratively optimizing the third network parameters of the second preset backbone model, the third preset backbone model, and the preset head network model by using the third target loss function that is generated, until the third target loss function converges, to obtain the second target preset backbone model, the third target preset backbone model, and the target preset head network model that have been trained.

6. The information processing method according to claim 5, further comprising: after obtaining the first target posture coefficient and obtaining the first target lighting coefficient, determining label geometry information and label texture information based on the shared identity coefficient and the shared texture coefficient that have been trained;

iteratively optimizing a fourth preset network model based on the label geometry information to obtain the fourth target preset network model; and iteratively optimizing a fifth preset network model based on the label texture information, to obtain the fifth target preset network model that have been trained.

7. The information processing method according to claim 6, wherein iteratively optimizing the fourth preset network model based on the label geometry information to obtain the fourth target preset network model; and iteratively optimizing the fifth preset network model based on the label texture information, to obtain the fifth target preset network model that have been trained, comprises:

generating a second target loss function; and iteratively optimizing second network parameters of the fourth preset network model and the fifth preset network model according to the second target loss function until the second target loss function converges, to obtain the fourth target preset network model and the fifth target preset network model that have been trained;

wherein the generating of the second target loss function comprises:

inputting the first target image feature into the fourth preset network model to obtain a first predicted identity coefficient; and inputting the first target image feature into the fifth preset network model to obtain a first predicted texture coefficient;

establishing a third difference based on a difference between the first predicted identity coefficient and a label identity coefficient and a difference between the first predicted texture coefficient and a label texture coefficient;

determining predicted geometry information and predicted texture information of second predicted face three-dimensional model according to the first predicted identity coefficient, the first predicted texture coefficient, the first target expression coefficient, the first target posture coefficient, and the first target lighting coefficient;

establishing a fourth difference based on a difference between the predicted geometry information and the label geometry information and a difference between the predicted texture information and the label texture information; and establishing the second target loss function based on the third difference and the fourth difference.

8. The information processing method according to claim 7, wherein iteratively optimizing the second network parameters of the fourth preset network model and the fifth preset network model according to the second target loss function until the second target loss function converges, to obtain the fourth target preset network model and the fifth target preset network model that have been trained, comprises:

optimizing the second network parameters of the fourth preset network model and the fifth preset network model according to the second target loss function;

returning to repeatedly performing the generation of the second target loss function, iteratively optimizing the second network parameters of the fourth preset network model and the fifth preset network model by using the second target loss function that is generated, until the second target loss function converges, to obtain the fourth target preset network model and the fifth target preset network model that have been trained.

9. The information processing method according to claim 8, further comprising:

obtaining a shared identity coefficient set of shared identity coefficients respectively corresponding to respective face images of different objects and a shared texture coefficient set of shared texture coefficients respectively corresponding to the respective face images of the different objects;

obtaining one of the shared identity coefficients corresponding to the face image of the same object in the target video as the shared identity coefficient, and obtaining one of the shared texture coefficients corresponding to the face image of the same object in the target video as the shared texture coefficient; and performing the expression coefficient prediction optimization training on the first preset network model according to the shared identity coefficient and the shared texture coefficient, to obtain a first target preset network model.

10. The information processing method according to claim 9, further comprising:

generating a first target loss function; and iteratively optimizing first network parameters of a first preset backbone model, the first preset network model, the second preset network model, the third preset network model, the shared identity coefficient, and the shared texture coefficient according to the first target loss function, until the first target loss function converges, to obtain the first target preset backbone model, the first target preset network model, the second target preset network model, the third target preset network model, the shared identity coefficient, and the shared texture coefficient that have been trained;

wherein, the generating of the first target loss function comprises:

inputting the face image of each frame into the first preset backbone model, to obtain the first image feature;

inputting the first image feature into the first preset network model to obtain a first predicted expression coefficient, inputting the first image feature into the second preset network model to obtain a first predicted posture coefficient, and inputting the first image feature into the third preset network model to obtain a first predicted lighting coefficient;

generating a first predicted face three-dimensional model according to the shared identity coefficient, the shared texture coefficient, the first predicted expression coefficient, the first predicted posture coefficient, and the first predicted lighting coefficient;

obtaining a first difference between a first face estimated value corresponding to the first predicted face three-dimensional model and an un-occluded area in the face image;

obtaining a second difference between first predicted face three-dimensional key points corresponding to the first predicted face three-dimensional model and face three-dimensional key points;

establishing a constraint relationship between the shared identity coefficient, the shared texture coefficient, and the first predicted expression coefficient through a regularization loss function; and generating the first target loss function according to the first difference, the second difference, and the constraint relationship.

11. The information processing method according to claim 10, wherein iteratively optimizing the first network parameters of the first preset backbone model, the first preset network model, the second preset network model, the third preset network model, the shared identity coefficient, and the shared texture coefficient according to the first target loss function, until the first target loss function converges, to obtain the first target preset backbone model, the first target preset network model, the second target preset network model, the third target preset network model, the shared identity coefficient, and the shared texture coefficient that have been trained, comprises:

optimizing the first network parameter of the first preset backbone model, the first preset network model, the second preset network model, the third preset network model, the shared identity coefficient, and the shared texture coefficient according to the first target loss function; and returning to repeatedly performing the generation of the first target loss function, iteratively optimizing the first network parameters of the first preset backbone model, the first preset network model, the second preset network model, the third preset network model, the shared identity coefficient, and the shared texture coefficient by using the first target loss function that is generated, until the first target loss function converges, to obtain the first target preset backbone model, the first target preset network model, the second target preset network model, the third target preset network model, the shared identity coefficient, and the shared texture coefficient that have been trained.

12. The information processing method according to claim 1, wherein determining the one of the one or more video segments with the number of frames greater than the preset threshold as the target video, comprises:

determining the one of the one or more video segments with the number of frames greater than the preset threshold as a first target video segment;

obtaining a second target video segment by performing a style transformation on the first target video segment; and determining each of the first target video segment and the second target video segment as the target video.

13. A computer device comprising:

a storage device;

at least one processor; and the storage device storing one or more programs, which when executed by the at least one processor, cause the at least one processor to:

obtain a target video comprising a plurality of frames, each frame of the plurality of frames comprising a face image of a same object; and for each frame of the frames, obtain a first target image feature by inputting the face image comprised in the each frame into a first target preset backbone model comprising a neural network model; and obtain a first target expression coefficient by inputting the first target image feature into a first target preset network model comprising a neural network model, wherein the first target preset network model is obtained by performing expression coefficient prediction optimization training on a first preset network model according to a shared identity coefficient and a shared texture coefficient for the same object involved in the plurality of frames, wherein the obtaining of the target video comprises:

obtaining an initial video;

extracting the face image of each frame in the initial video;

determining the same object by analyzing the face image of each frame, and determining one or more video segments from the initial video, each of the one or more video segments includes at least two frames, and the same object appears in each of the at least two frames; and determining one of the one or more video segments with a number of frames greater than a preset threshold as the target video.

14. The computer device according to claim 13, wherein after obtaining the first target image feature, the at least one processor is further configured to:

input the first target image feature into a second target preset network model comprising a neural network model, to obtain a first target posture coefficient; and input the first target image feature into a third target preset network model comprising a neural network model, to obtain a first target lighting coefficient, wherein the second target preset network model is obtained by performing posture coefficient prediction optimization training on a second preset network model according to the shared identity coefficient and the shared texture coefficient, and the third target preset network model is obtained by performing lighting coefficient prediction optimization training on a third preset network model according to the shared identity coefficient and the shared texture coefficient; and input the first target image feature into a fourth target preset network model comprising a neural network model, to obtain a first target identity coefficient; and input the first target image feature into a fifth target preset network model comprising a neural network model, to obtain a first target texture coefficient, wherein the fourth target preset network model is obtained by performing identity coefficient prediction optimization training on a fourth preset network model after determining the first target expression coefficient, the first target posture coefficient and the first target lighting coefficient, and the fifth target preset network model is obtained by performing texture coefficient prediction optimization training on a fifth preset network model after determining the first target expression coefficient, the first target posture coefficient and the first target lighting coefficient.

15. The computer device according to claim 14, wherein the at least one processor is further configured to:

obtain a second target identity coefficient and a second target texture coefficient of the face image comprised in another one of the frames different from the each frame;

input the second target identity coefficient into a second target preset backbone model comprising a neural network model, to obtain a first target identity feature;

input the second target texture coefficient into a third target preset backbone model comprising a neural network model, to obtain a first target texture feature;

splice the first target image feature, the first target identity feature, and the first target texture feature together to obtain a first target feature; and input the first target feature into a target preset head network model comprising a neural network model, to obtain a second target expression coefficient, wherein the target preset head network model is obtained by performing prediction optimization training on a preset head network model with a prior identity coefficient and a prior texture coefficient of the face image contained in each one of the frames different from the each frame.

16. The computer device according to claim 15, wherein after obtaining the second target identity coefficient and the second target texture coefficient of the face image another one of the frames different from the each frame, the at least one processor is further configured to:

generate a third target loss function;

iteratively optimize third network parameters of a second preset backbone model, a third preset backbone model, and a preset head network model according to the third target loss function, until the third target loss function converges, to obtain the second target preset backbone model, the third target preset backbone model and the target preset head network model that have been trained;

wherein the at least one processor generates the third target loss function by:

inputting the second target identity coefficient into the second preset backbone model, to obtain a first identity feature;

inputting the second target texture coefficient into the third preset backbone model, to obtain the first texture feature;

splicing the first target image feature, the first identity feature, and the first texture feature together to obtain a first feature;

inputting the first feature into the preset head network model, to obtain a second predicted expression coefficient;

generating a third predicted face three-dimensional model according to the first target identity coefficient, the first target texture coefficient, the second predicted expression coefficient, the first target posture coefficient, and the first target lighting coefficient;

obtaining a fifth difference between a second face estimated value corresponding to the third predicted face three-dimensional model and an un-occluded area in the face image;

obtaining a sixth difference between second predicted face three-dimensional key points corresponding to the third predicted face three-dimensional model and face three-dimensional key points; and establishing the third target loss function based on the fifth difference and the sixth difference.

17. The computer device according to claim 16, wherein the at least one processor iteratively optimizes the third network parameters of the second preset backbone model, the third preset backbone model, and the preset head network model according to the third target loss function, until the third target loss function converges, to obtain the second target preset backbone model, the third target preset backbone model and the target preset head network model that have been trained, by:

optimizing the third network parameters of the second preset backbone model, the third preset backbone model, and the preset head network model according to the third target loss function; and returning to repeatedly performing the generation of the third target loss function, iteratively optimizing the third network parameters of the second preset backbone model, the third preset backbone model, and the preset head network model by using the third target loss function that is generated, until the third target loss function converges, to obtain the second target preset backbone model, the third target preset backbone model, and the target preset head network model that have been trained.

18. The computer device according to claim 17, wherein after the first target posture coefficient and the first target lighting coefficient are obtained, the at least one processor is further configured to:

determine label geometry information and label texture information based on the shared identity coefficient and the shared texture coefficient that have been trained;

iteratively optimize a fourth preset network model based on the label geometry information to obtain the fourth target preset network model; and iteratively optimize a fifth preset network model based on the label texture information, to obtain the fifth target preset network model that have been trained.

19. A non-transitory storage medium having instructions stored thereon, when the instructions are executed by a processor of a computer device, the processor is caused to perform an information processing method, wherein the method comprises:

obtaining a target video comprising a plurality of frames, each frame of the plurality of frames comprising a face image of a same object; and for each frame of the frames, obtain a first target image feature by inputting the face image comprised in the each frame into a first target preset backbone model comprising a neural network model; and obtaining a first target expression coefficient by inputting the first target image feature into a first target preset network model comprising a neural network model, wherein the first target preset network model is obtained by performing expression coefficient prediction optimization training on a first preset network model according to a shared identity coefficient and a shared texture coefficient for the same object involved in the plurality of frames, wherein the obtaining of the target video comprises:

obtaining an initial video;

extracting the face image of each frame in the initial video;

determining the same object by analyzing the face image of each frame, and determining one or more video segments from the initial video, each of the one or more video segments includes at least two frames, and the same object appears in each of the at least two frames; and determining one of the one or more video segments with a number of frames greater than a preset threshold as the target video.

* * * * *